(12) United States Patent
Garvia et al.

(10) Patent No.: US 11,095,559 B1
(45) Date of Patent: Aug. 17, 2021

(54) SEGMENT ROUTING (SR) FOR IPV6 (SRV6) TECHNIQUES FOR STEERING USER PLANE (UP) TRAFFIC THROUGH A SET OF USER PLANE FUNCTIONS (UPFS) WITH TRAFFIC HANDLING INFORMATION

(71) Applicant: Cisco Technology, Inc., San Jose, CA (US)

(72) Inventors: Pablo Camarillo Garvia, Madrid (ES); Ravi Shekhar, Maharastra (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 5 days.

(21) Appl. No.: 16/574,501

(22) Filed: Sep. 18, 2019

(51) Int. Cl.
*H04L 12/749* (2013.01)
*H04L 12/721* (2013.01)
*H04W 40/12* (2009.01)
*H04L 12/725* (2013.01)

(52) U.S. Cl.
CPC .......... *H04L 45/741* (2013.01); *H04L 45/302* (2013.01); *H04L 45/306* (2013.01); *H04L 45/38* (2013.01); *H04W 40/12* (2013.01)

(58) Field of Classification Search
CPC ... H04L 45/741; H04L 45/302; H04L 45/306; H04L 45/38; H04W 40/12
USPC ........................................ 370/351, 389, 392
See application file for complete search history.

(56) References Cited

U.S. PATENT DOCUMENTS

| | | |
|---|---|---|
| 6,765,881 B1 | 7/2004 | Rajakarunanayake |
| 8,839,409 B2 | 9/2014 | Cheriton |
| 9,049,233 B2 | 6/2015 | Frost et al. |
| 9,369,303 B2 | 6/2016 | Diwane et al. |
| 10,230,605 B1 | 3/2019 | Filsfils et al. |
| 10,361,969 B2 | 7/2019 | Bosch et al. |
| 10,736,029 B1* | 8/2020 | Young ................ H04W 40/246 |
| 2014/0063822 A1 | 3/2014 | Sasaki et al. |
| 2017/0026417 A1 | 1/2017 | Ermagan et al. |
| 2017/0064749 A1 | 3/2017 | Jain et al. |
| 2017/0093685 A1* | 3/2017 | Retana .................... H04L 45/02 |
| 2017/0195205 A1 | 7/2017 | Li et al. |
| 2017/0346718 A1 | 11/2017 | Psenak et al. |

(Continued)

OTHER PUBLICATIONS

CISCO, "Cisco Converged 5G xHaul Transport", Jun. 21, 2019, 35 pages.

(Continued)

*Primary Examiner* — Obaidul Huq
(74) *Attorney, Agent, or Firm* — Edell, Shapiro & Finnan, LLC

(57) ABSTRACT

A user plane function (UPF) for use in a mobile network may receive an Internet Protocol version 6 (IPv6) data packet which includes a segment routing header and a payload containing user plane (UP) traffic data associated with a user equipment (UE). The segment routing header may indicate a list of segment identifiers comprising IPv6 addresses. Each first address portion of an IPv6 address may indicate a location of a corresponding UPF in a set of UPFs which define a forwarding path of the IPv6 data packet in the mobile network. Each second address portion of an IPv6 address may indicate one or more rules, actions, or parameters (e.g. forwarding action rules, buffering action rules, etc.) to be applied to the IPv6 data packet at the corresponding UPF in the set of UPFs indicated by the first address portion that is associated with the second address portion.

20 Claims, 23 Drawing Sheets

(56) References Cited

U.S. PATENT DOCUMENTS

| | | | |
|---|---|---|---|
| 2018/0234876 A1* | 8/2018 | Jheng | H04L 47/2441 |
| 2018/0270715 A1 | 9/2018 | Lee et al. | |
| 2018/0270743 A1 | 9/2018 | Callard et al. | |
| 2018/0367402 A1 | 12/2018 | Harneja et al. | |
| 2019/0190818 A1 | 6/2019 | Ceccarelli et al. | |
| 2019/0191467 A1 | 6/2019 | Dao et al. | |
| 2019/0268383 A1 | 8/2019 | Maino et al. | |
| 2019/0288873 A1 | 9/2019 | Camarillo Garvia et al. | |
| 2019/0306251 A1 | 10/2019 | Talebi Fard et al. | |
| 2020/0007590 A1 | 1/2020 | Dodd-Noble et al. | |
| 2020/0059992 A1* | 2/2020 | Skog | H04L 45/38 |
| 2020/0128469 A1* | 4/2020 | Akhavain Mohammadi | H04L 45/50 |

OTHER PUBLICATIONS

P. Camarillo, Ed. et al., "SRv6 Mobility Use-Cases", draft-camarilloelmalky-springdmm-srv6-mob-usecases-00, Jul. 15, 2018, 14 pages.

Pier Luigi Ventre et al., "Segment Routing: a Comprehensive Survey of Research Activities, Standardization Efforts and Implementation Results", arXiv:1904.03471v2 [cs.NI], Apr. 12, 2019, 29 pages.

J. Chunduri, Ed. et al., "Transport Network aware Mobility for 5G", draft-clt-dmm-tn-aware-mobility-03, Feb. 14, 2019, 22 pages.

Simon Spraggs et al., CISCO, "Cisco Converged 5G xHaul Transport", C11-741529-00, downloaded Sep. 4, 2019, 25 pages.

Satoru Matsushima, "Reducing the complexity of 5G networks using Segment Routing IPv6", https://blog.apnic.net/2018/03/07/reducing-complexity-5g-networks-using-segment-routing-ipv6/, Mar. 7, 2018, 10 pages.

K. Bogineni et al., "Optimized Mobile User Plane Solutions for 5G", draft-bogineni-dmm-optimized-mobile-user-plane-01, Jun. 29, 2018, 65 pages.

ETSI, "5G; System Architecture for the 5G System (3GPP TS 23.501 version 15.2.0 Release 15)", ETSI TS 123 501 V15.2.0, Jun. 2018, 219 pages.

Clarence Filsfils et al., "An Adoptive and Resilient Segment Routing Version 6 Policy to Address Tight Service Level Agreement Requirements in 5G Networks", Feb. 13, 2019, 6 pages.

C. Filsfils, Ed. et al., "Segment Routing Architecture", Request for Comments: 8402, Jul. 2018, 32 pages.

S. Matsushima, "Segment Routing IPv6 for Mobile User Plane", draft-ietf-dmm-srv6-mobile-uplane-05, Jul. 8, 2019, 28 pages.

3GPP, "3rd Generation Partnership Project; Technical Specification Group Core Network and Terminals; Study on User Plane Protocol in 5GC. (Release 16)", 3GPP TR 29.892 V1.2.0, May 2019, 49 pages.

3GPP, "3rd Generation Partnership Project; Technical Specification Group Core Network and Terminals; Interface between the Control Plane and the User Plane Nodes; Stage 3 (Release 16)", 3GPP TS 29.244 V16.0.0, Jun. 2019, 228 pages.

A. Sgambelluri et al., "SDN and PCE Implementations for Segment Routing", Jun. 30-Jul. 2, 2015, 4 pages.

SoftBank Corp., "Pseudo-CR on SRv6 Impact for 5GC", 3GPP TR 29.892, C4-187226, 3GPP TSG CT WG4 Meeting #86-bis, Oct. 2018, 2 pages.

SoftBank Corp., "Pseudo-CR on SRv6 Impact on SMF", 3GPP TR 29.892, C4-187225, 3GPP TSG CT WG4 Meeting #86-bis, Oct. 2018, 2 pages.

3GPP, "3rd Generation Partnership Project; Technical Specification Group Core Network and Terminals; Study on User Plane Protocol in 5GC. (Release 16)", 3GPP TR 29.892 V0.3.0, Oct. 2018, 20 pages.

Kim et al., "Spring Use Cases for Mobile Network", Network Working Group of Internet Draft for Internet Engineering Task Force (IETF), Oct. 31, 2016, pp. 1-12.

International Search Report and Written Opinion in counterpart International Application No. PCT/US2019/054431, dated Feb. 7, 2020, 15 pages.

Farrel, Adrian et al., "Segment Routing: Cutting Through the hype and finding the IETF's Innivative Nugget of Gold", https://www.ietfjournal.org/segment-routing-cutting-through-the-hype-and-finding-the-ietfs-innovative-nugget-of-gold/IETF Journal, Jul. 5, 2017, 32 pages.

* cited by examiner

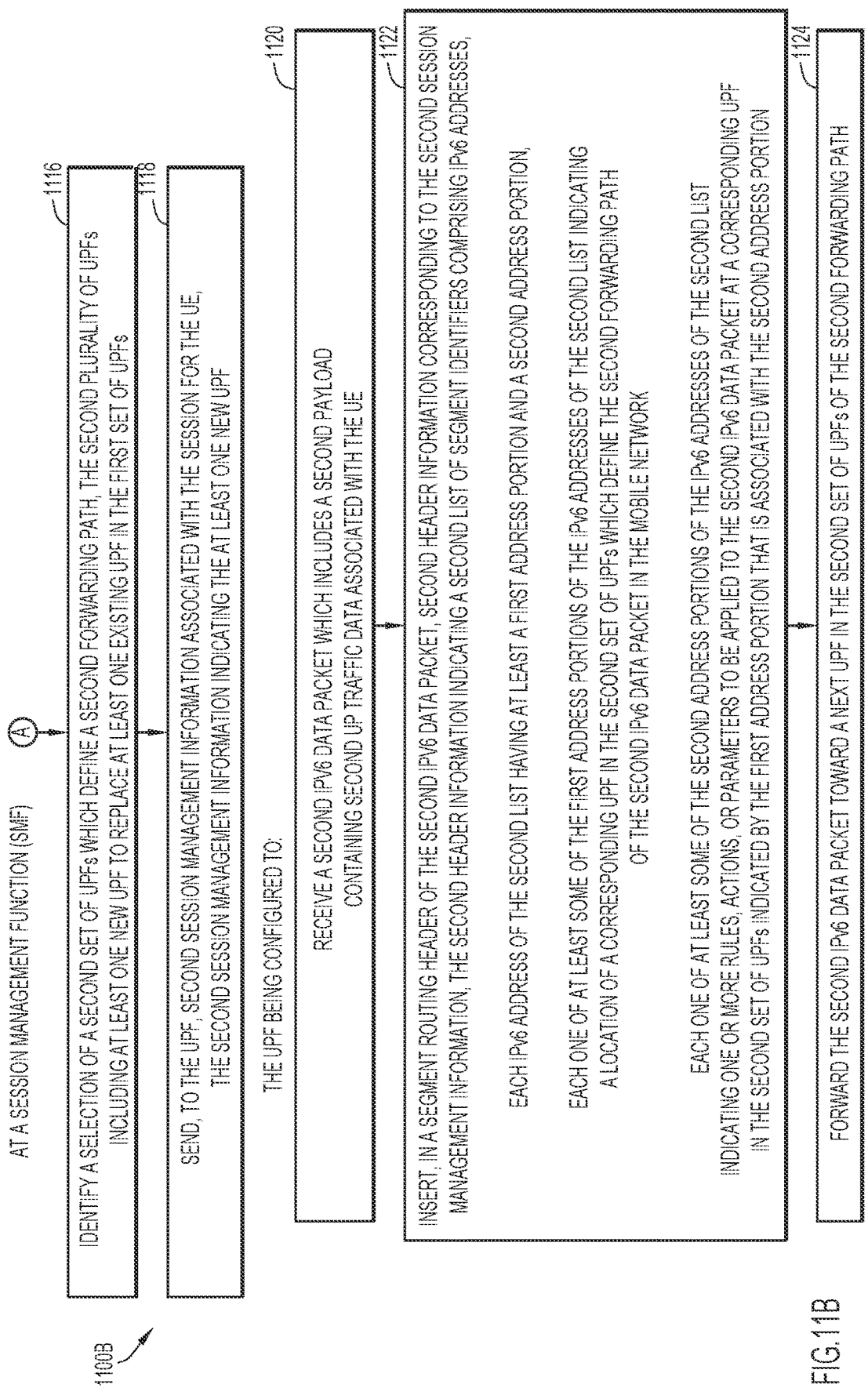

SEGMENT ROUTING (SR) FOR IPV6 (SRV6) TECHNIQUES FOR STEERING USER PLANE (UP) TRAFFIC THROUGH A SET OF USER PLANE FUNCTIONS (UPFS) WITH TRAFFIC HANDLING INFORMATION

TECHNICAL FIELD

The present disclosure relates generally to mobile networks, such as Fifth Generation (5G) networks, and more particularly to routing user plane (UP) traffic through a set of User Plane Functions (UPFs) with traffic handling information in a 5G network using Segment Routing (SR) for Internet Protocol version 6 (IPv6) (SRv6) or the like.

BACKGROUND

Fifth Generation (5G) technology is being defined in specifications from the Third Generation Partnership Project (3GPP), specifications which include 3GPP Technical Specification (TS) 23.501. In the current 5G system (5GS), each one of a set of User Plane Functions (UPFs) in a N9 service chain may connect with a Session Management Function (SMF).

The SMF may establish a Packet Forwarding Control Protocol (PFCP) session with each UPF over an N4 interface. In the PFCP sessions, the SMF may perform session management which may include sending each UPF a set of policy rules for handling User Plane (UP) traffic.

Given a number of UPFs that may be utilized along the N9 service chain, N4 signaling associated with the chain of UPFs may become burdensome. This problem may be compounded as the number of UPFs in the chain increases. Further, as described in 3GPP TS 29.244, each UPF needs to locate a matching PFCF session upon receiving a packet, before identifying a set of associated rules. Such activities slow down packet processing at each UPF in the service chain.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIGS. 11A-11B are flowcharts for describing methods for use in processing data packets of a communication associated with a UE, which may be performed by a control plane (CP) entity for session management, such as an session management function (SMF), according to some implementations of the present disclosure;

DESCRIPTION OF EXAMPLE EMBODIMENTS

Figure 1A:
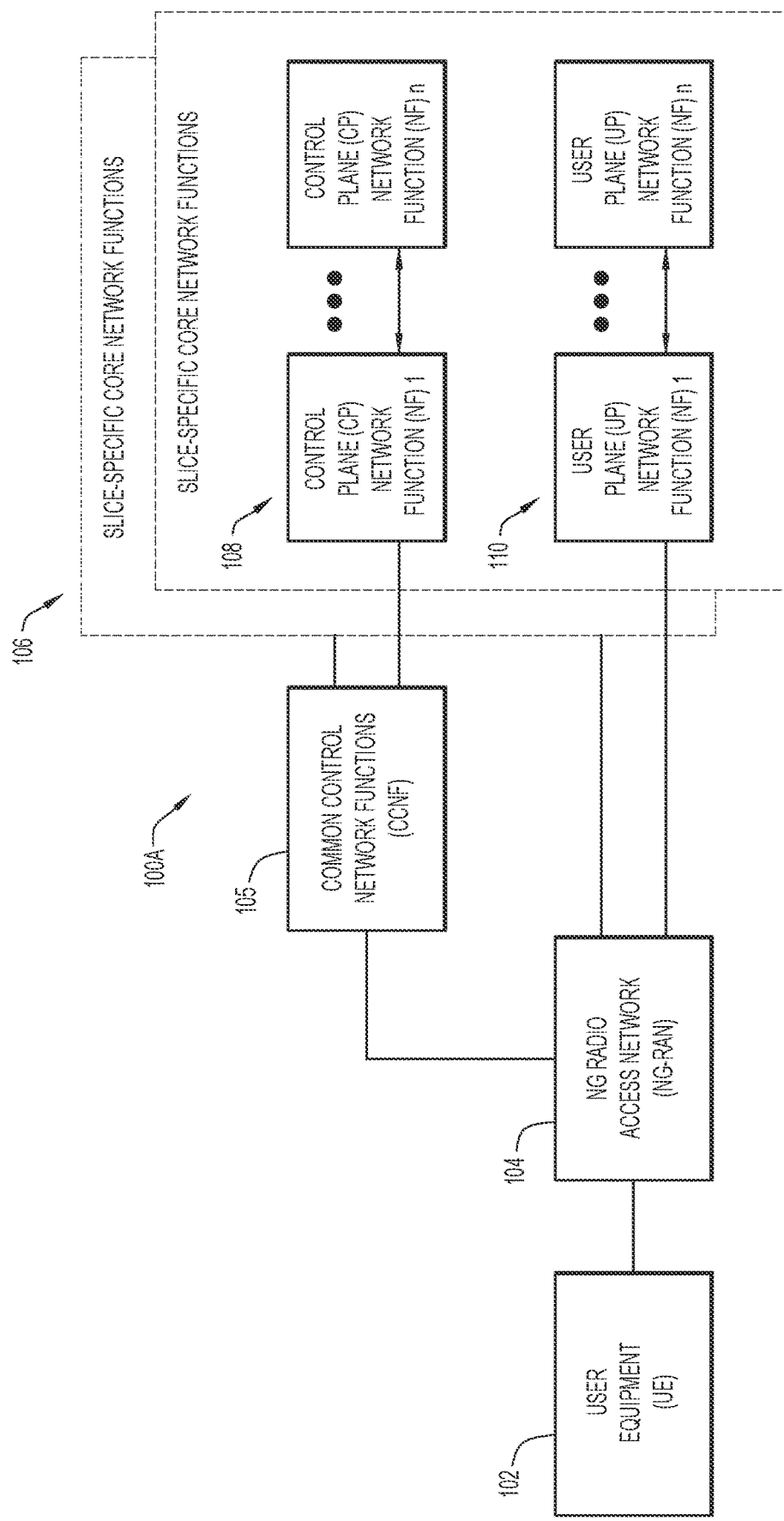
FIG. 1A is an illustrative representation of a general network architecture of a Fifth Generation (5G) network.

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

Techniques and mechanisms using Segment Routing (SR) for Internet Protocol version 6 (IPv6) (SRv6) for steering User Plane (UP) traffic through a set of User Plane Functions (UPFs) along with traffic handling information are described herein.

In one illustrative example, a UPF configured for use in a mobile network may receive an IPv6 data packet which includes a segment routing header and a payload containing UP traffic data associated with a user equipment (UE). The IPv6 data packet may be an SRv6 data packet. The segment routing header may indicate a list of segment identifiers (IDs) (SIDs) comprising IPv6 addresses, where each IPv6 address has at least a first address portion and a second address portion. Each first address portion of the IPv6 addresses may indicate a location of a corresponding UPF in a set of UPFs which define a forwarding path of the IPv6 data packet in the mobile network. Each second address portion of the IPv6 addresses may indicate one or more rules, actions, or parameters (e.g. forwarding action rules, buffering action rules, etc.) to be applied to the IPv6 data packet at the corresponding UPF in the set of UPFs indicated by the first address portion that is associated with the second address portion. In preferred implementations, SRv6 network programming may be utilized to provide appropriate SID or SID-based functionality at the UPFs.

More detailed and alternative techniques and implementations are provided herein as described below.

EXAMPLE EMBODIMENTS

According to some implementations of the present disclosure, in a Fifth Generation (5G) network, Segment Routing (SR) for IPv6 (SRv6) data packets associated with a User Equipment (UE) may be routed and steered through a chain or set of User Plane Functions (UPFs) as specified in a Segment Identifier (ID) (SID) list of a Segment Routing Header (SRH). The SID list may be inserted in the SRH at a source or "head-end" UPF of the set of UPFs. SRv6 programmability may be utilized for providing sets of policy rules to at least some of the UPFs, rules such as Packet Detection Rules (PDRs), Forwarding Action Rules (FARs), Quality of Service (QoS) Enforcement Rules (QERs), etc. Using these techniques, N4 session signaling with a Session Management Function (SMF) for at least some of the UPFs may be reduced or eliminated.

To better explain, FIG. 1A is an illustrative representation of a general network architecture 100A of a Fifth Generation (5G) network. Network architecture 100A includes common control network functions (CCNF) 105 and a plurality of slice-specific core network functions 106. With network architecture 100A, the 5G network may be configured to facilitate communications for a user equipment (UE) 102. UE 102 may obtain access to the 5G network via a radio access network (RAN) or a Next Generation (NG) RAN (NG-RAN) 104. UE 102 may be any suitable type of device, such as a cellular telephone, a smart phone, a tablet device, an Internet of Things (IoT) device, a machine-to-machine (M2M) device, and a sensor, to name but a few.

Notably, the 5G network includes a Service-Based Architecture (SBA) which may provide a modular framework from which common applications can be deployed using components of varying sources and suppliers. The SBA of the 5G network may be configured such that control plane functionality and common data repositories are provided by way of a set of interconnected Network Functions (NFs), each with authorization to access each other's services.

Accordingly, CCNF 105 includes a plurality of NFs which commonly support all sessions for UE 102. UE 102 may be connected to and served by a single CCNF 105 at a time, although multiple sessions of UE 102 may be served by different slice-specific core network functions 106. CCNF 105 may include, for example, an access and mobility management function (AMF) and a network slice selection function (NSSF). UE-level mobility management, authentication, and network slice instance selection are examples of functionalities provided by CCNF 105.

On the other hand, slice-specific core network functions 106 of the network slices may be separated into control plane (CP) NFs 108 and user plane (UP) NFs 110. In general, the user plane carries user traffic while the control plane carries network signaling. CP NFs 108 are shown in FIG. 1A as CP NF 1 through CP NF n, and UP NFs 110 are shown in FIG. 1A as UP NF 1 through UP NF n. CP NFs 108 may include, for example, a session management function (SMF), whereas UP NFs 110 may include, for example, a user plane function (UPF).

Figure 1B:
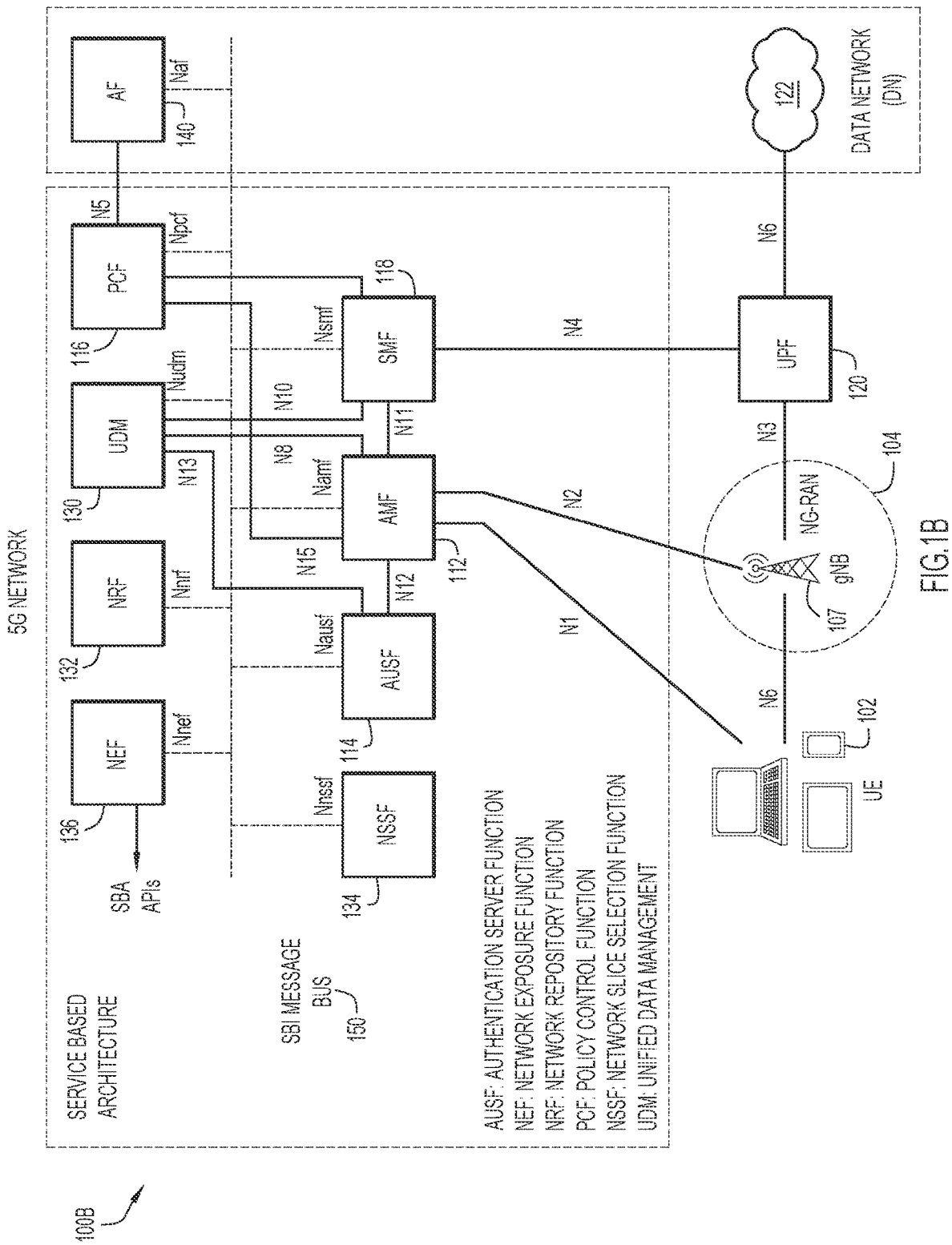
FIG. 1B is an illustrative representation of a more detailed network architecture of the 5G network of FIG. 1A.

FIG. 1B is an illustrative representation of a more detailed network architecture 100B of the 5G network of FIG. 1A. As provided in the Third Generation Partnership Project (3GPP) standards for 5G (e.g. 3GPP Technical Specifications or "TS" 23.501 and 23.502), network architecture 100B for the 5G network may include an AMF 112, an authentication server function (AUSF) 114, a policy control function (PCF) 116, an SMF 118, and a UPF 120 which may connect to a data network (DN) 122. Other NFs in the 5G network include an NSSF 134, a network exposure function (NEF) 136, a network function (NF) repository function (NRF) 132, and a Unified Data Management (UDM) function 130. A plurality of interfaces and/or reference points N1-N8, N10-N13, and N15 shown in FIG. 1B (as well as others) may define the communications and/or protocols between each of the entities, as described in the relevant (evolving) standards documents.

In FIG. 1B, UPF 120 is part of the user plane and all other NFs (i.e. AMF 112, AUSF 114, PCF 116, SMF 118, and UDM 130) are part of the control plane. One or more Packet Data Unit (PDU) sessions may be established for UP traffic associated with UE 102 via a base station such as a gNodeB (gNB) 107. Separation of user and control planes guarantees that each plane resource may be scaled independently. It also allows UPFs to be deployed separately from CP functions in a distributed fashion. The NFs in the CP are modularized functions; for example, AMF 112 and SMF 118 may be independent functions allowing for independent evolution and scaling.

The SBA of the 5G network is better illustrated in FIG. 1B, again where control plane functionality and common data repositories may be provided by the set of interconnected NFs, each with authorization to access each other's services. With the SBA, each NF service may expose its functionality through a Service Based Interface (SBI) message bus 150. SBI message bus 150 may employ a Representational State Transfer (REST) interface (e.g. using Hypertext Transfer Protocol or "HTTP"/2). As indicated in FIG. 1B, the SBI interfaces of SBI message bus 150 may include an Namf for AMF 112, an Nausf for AUSF 114, an Npcf for PCF 116, an Nsmf for SMF 118, an Nudm for UDM 130, an Nnrf for NRF 132, an Nnssf for NSSF 134, an Nnef for NEF 136, and an Naf for AF 140. Assuming the role of either service consumer or service producer, these NFs may be self-contained, independent and reusable.

Network slicing brings a high degree of deployment flexibility and efficient resource utilization when deploying diverse network services and applications. NSSF 134 may facilitate the use of network slices in the 5G network, operating to select network slice instances (NSIs) for UE communications. A logical, end-to-end network slice may have predetermined capabilities, traffic characteristics, and service level agreements (SLAs), and may include the virtualized resources required to service the needs of a Mobile Virtual Network Operator (MVNO) or group of subscribers, such as a dedicated UPF 120, SMF 118, and PCF 116.

UDM 130 may provide services to SBA functions, such as AMF 112, SMF 118 and NEF 136. UDM 130 is typically recognized as a stateful message store, holding information in its local memory. Alternatively, UDM 130 may be stateless, storing information externally within a Unified Data Repository (UDR). UDM 130 may be considered to be analogous to a Home Subscriber Server (HSS), providing authentication credentials while being employed by AMF 112 and SMF 118 to retrieve subscriber data and context.

One or more application functions, such as an application function (AF) 140 may connect to the 5G network, for example, via PCF 116. AF 140 may interact with the network via NEF 136 in order to access network capabilities. NEF 136 may securely expose network capabilities and events provided by NFs to AF 140, and may provide a means for AF 140 to securely provide information to the 5G network.

In general, NRF 132 may maintain NF profiles of available NF instances and their associated services, and support a service discovery function for service discovery associated with the NF profiles. NF profiles of NF instances maintained in NRF 132 may include NF instance ID, NF type, network slice identifiers such as NSI ID, NF capacity information, names of supported services, etc. For service discovery, NRF 132 may receive a discovery request from an NF instance and provide information associated with the discovered NF instance to the NF instance in response.

According to current 5G standards, SMF 118 may establish N4 sessions with UPFs (such as UPF 120) over the N4 interface for session management associated PDU sessions of a UE. The N4 sessions with the UPFs may be and/or be referred to as Packet Forwarding Control Protocol (PFCP) sessions. Typically, SMF 118 may use one or more one or more procedures to manage the N4 sessions associated with PDU sessions. These procedures may include N4 session establishment, modification, and release. SMF 118 may use these procedures to manage N4 contexts in the associated UPFs.

For example, SMF 118 may use an N4 Session Establishment to create a new PDU session in UPF 120 or to change UPF 120 for an existing PDU session. The information conveyed to UPF 120 may include identifiers for the entities involved, as well as policy rules that govern behavior of UPF 120 with respect to PDU sessions. SMF 118 may use an N4 Session Modification procedure to update context information as needed. When SMF 118 determines that an N4 context should be removed from UPF 120, it may initiate the N4 Session Release procedure. Again, policy rules provided by SMF 118 to UPF 120 may govern the conduct of UPF 120 in managing a PDU session. One or more rules conveyed to a UPF may include a Packet Detection Rule (PDR), a Forwarding Action Rule (FAR), a QoS Enforcement Rule (QER), a Usage Reporting Rule (URR), and a Buffering Action Rule (BAR).

Figure 2A:
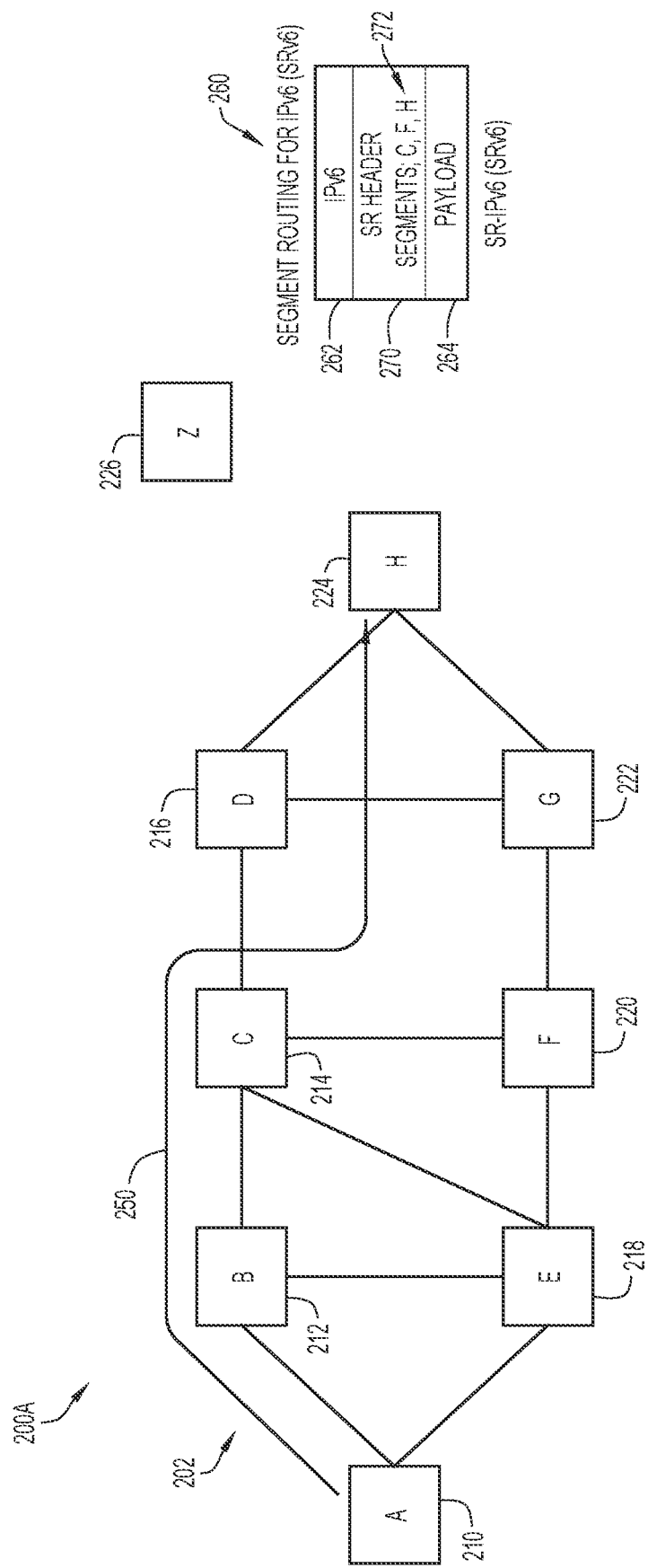
FIGS. 2A, 2B, 2C, and 2D are illustrative block diagrams of communication networks operative to route IP traffic flows with use of a segment routing (SR) for IPv6 (SRv6) protocol.

As described herein, it is proposed that Segment Routing (SR) for Internet Protocol (IP) version 6 (IPv6) (SRv6) be utilized as a new transport protocol for 5G data traffic in a 5G network. To help explain and illustrate, FIG. 2A is a block diagram of a communication network 200A operative to route IP traffic flows with use of SRv6. The communication network 200A of FIG. 2A is shown for illustrative and explanatory purposes of some aspects of SRv6.

SRv6 may be considered to be a source-based routing protocol (e.g. in contrast to a destination-based routing protocol). In FIG. 2A, the communication network 200A includes a plurality of nodes 202 (e.g. routers, servers, gateways, etc.). In this example, the plurality of nodes 202 includes nodes 210, 212, 214, 216, 218, 220, 222, 224, and 226 which are designated as nodes A, B, C, D, E, F, G, H, and Z, respectively. Here, node 210 (i.e. node A) is considered to be a source node and node 226 (i.e. node Z) is considered to be a destination node. Nodes 212, 214, 216, 218, 220, 222, and 226 which correspond to nodes B, C, D, E, F, and G are part of an SR domain (i.e. nodes that are SRv6-capable nodes/SRv6-configured nodes). The source node (node 210 or A) and the destination node (node 226 or Z) may or may not be part of (i.e. they may or may not be outside of the SR domain (e.g. they may or may not be SRv6-configured nodes; they may be "normal" IPv6 configured nodes).

A basic data format of an SR-IPv6 packet 260 for use in SRv6 routing is also shown in FIG. 2A. As illustrated, the data format of SR-IPv6 packet 260 includes an IPv6 header 262 and a payload 264. For SRv6 routing of IPv6 packet 260, the data format of IPv6 packet 260 further includes a segment routing (SR) header 270 or "SRH" (i.e. an extension header for SR as defined by Request for Comments (RFC) 2460). SR header 270 may include an ordered list of segments 272 which defines a network path 250 along which the SR-IPv6 packet 260 will be communicated in communication network 200A. In the example of FIG. 2A, the ordered list of segments 272 includes node 214 ("node C"), node 220 ("node F"), and node 224 ("node H") in network path 250. A segment is or includes an instruction (e.g. forwarding, servicing, application-specific, etc.) to be applied to the SR-IPv6 packet 260. Thus, an SR-IPv6 packet (e.g. SR-IPv6 packet 260) may be communicated in communication network 200A from a source node (e.g. node 210 or A) to a destination node (e.g. a node 226 or Z) along a desired or predetermined network path 250. The source node (e.g. node 210 or A) may operate to choose this network path 250 and encode it in the SR header 270 as the ordered list of segments 272. The rest of communication network 200A may operate to execute the encoded instructions without any further per-flow state.

Figure 2B:
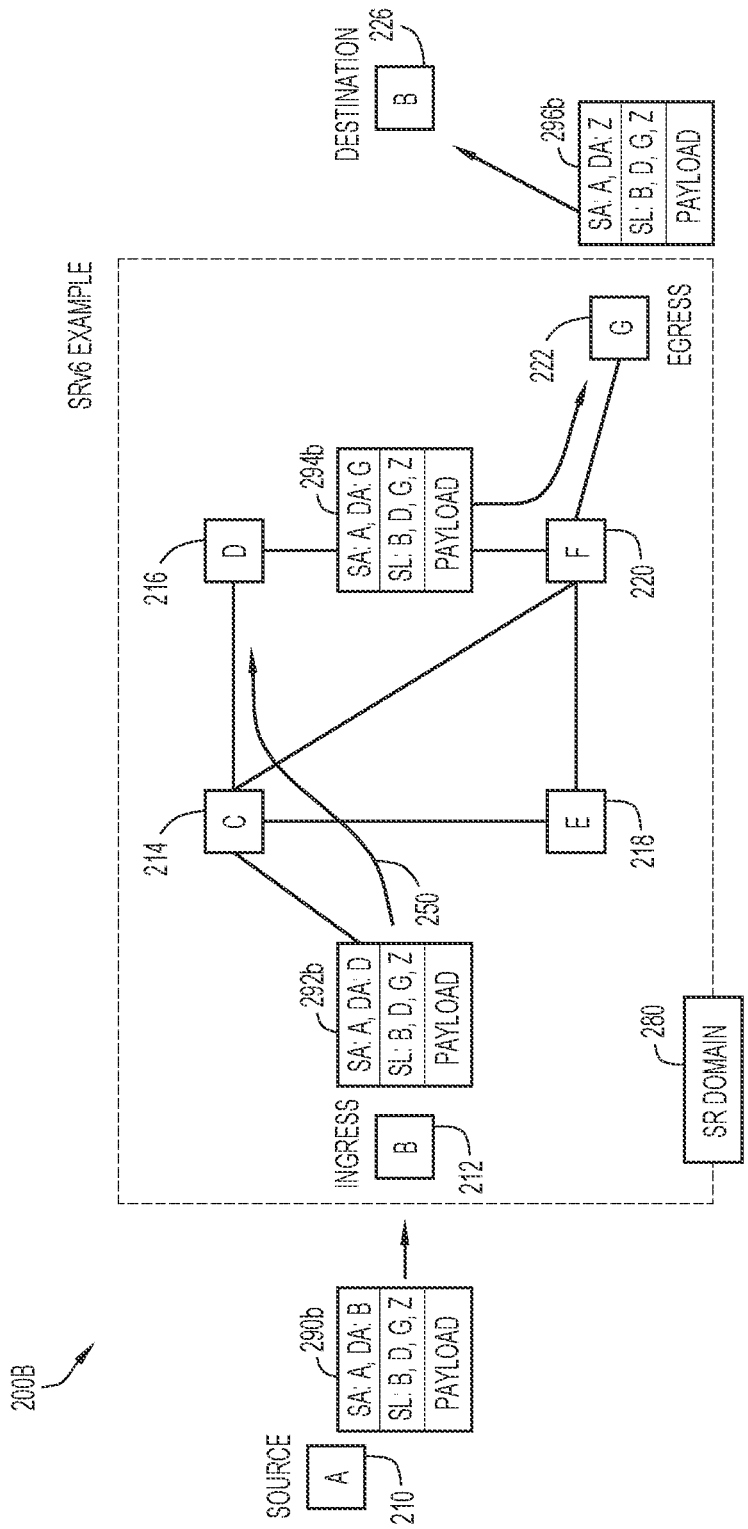

FIG. 2B is an illustrative representation of a communication network 200B which is similar to communication network 200A of FIG. 2A. Here, nodes 212, 214, 216, 218, 220, 222, and 226 which correspond to nodes B, C, D, E, F, and G are shown to be part of an SR domain 280. The source node (node 210 or A) and the destination node (node 226 or Z) are not part of or outside of the SR domain 280 (e.g. they may or may not be SRv6-configured nodes). In the example of FIG. 2B, node 212 or B may be considered as an ingress node of the SR domain 280 and node 222 or G may be considered as an egress node of the SR domain 280.

Note that an SR header may be inserted in an IPv6 packet at a source node or at an ingress node, or even encapsulated at the ingress node, as a few examples. In the example shown in FIG. 2B, an SR header of an IPv6 packet is inserted at the source node (node 210 or A) to produce an SR-IPv6 packet 290*b*. In this case, the source node (node 210 or A) which is SRv6-capable may originate the SR-IPv6 packet 290*b*. Here, the SR header of SR-IPv6 packet 290*b* includes an ordered list of segments (SL) designating nodes B, D, G, and Z to define network path 250. Initially, a source address (SA) of SR-IPv6 packet 290b is designated as node A and a destination address (DA) of SR-IPv6 packet 290b is designated as node B (i.e. the first node in the SL). When SR-IPv6 packet 290b is communicated to the ingress node (i.e. node 212 or B), the DA is modified by the ingress node to include the next or second node in the SL (i.e. node D), as indicated in SR-IPv6 packet 292b. When SR-IPv6 packet 292b is communicated to the node D (via node C), the DA is modified by node D to include the next or third node in the SL (i.e. node G), as indicated in SR-IPv6 packet 294b. When SR-IPv6 packet 294b is further communicated to the node G (via node F), the DA is modified by node G to include the next or fourth node in the SL (i.e. node Z which is the destination node), as indicated in SR-IPv6 packet 296b.

Figure 2C:
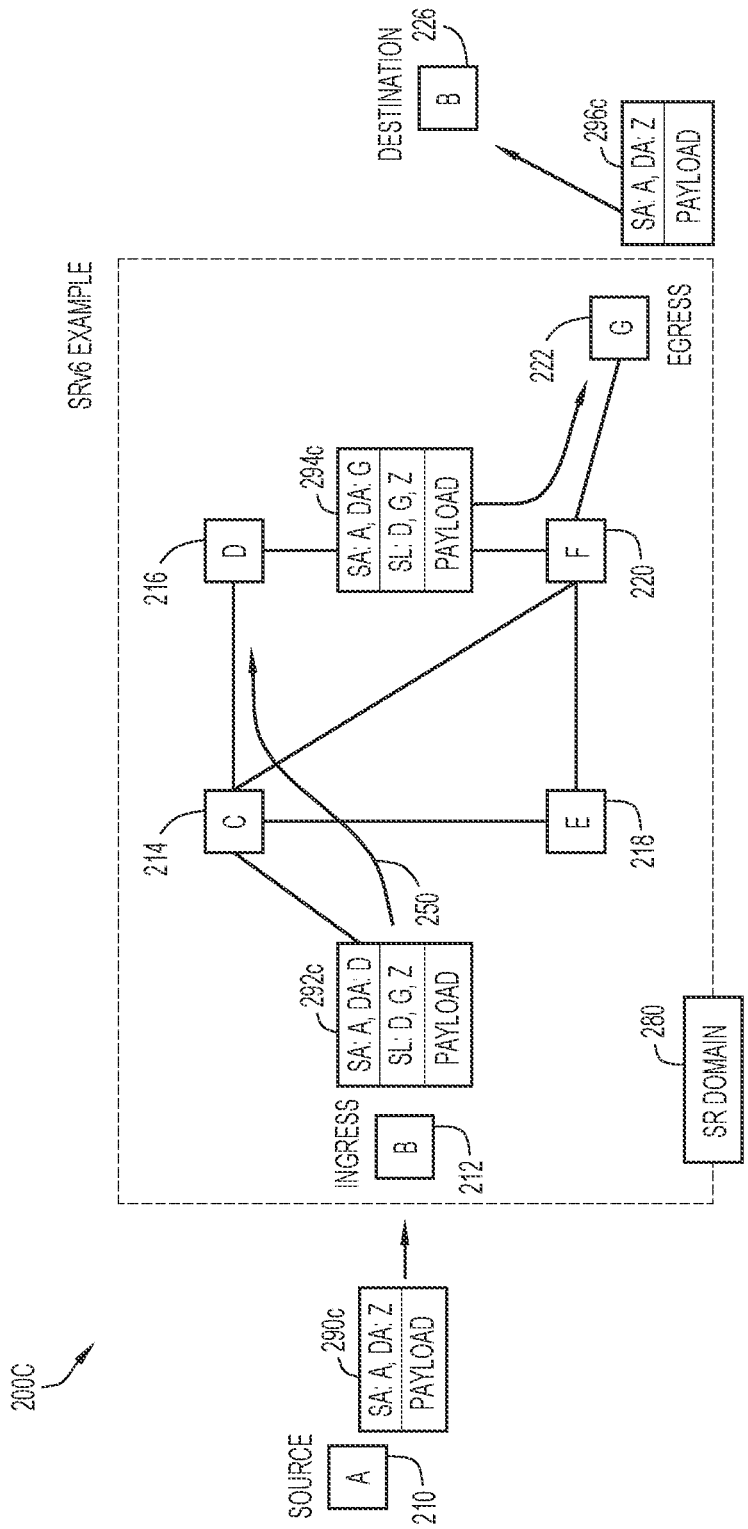

In the example associated with a communication network 200C of FIG. 2C, an SR header of an IPv6 packet 290c is inserted at the ingress node (node 212 or B) to produce an SR-IPv6 packet 292c. Here, the SR header of SR-IPv6 packet 292c includes an ordered list of segments (SL) designating nodes D, G, and Z to define network path 250. In this case, the source node, which may or may not be SRv6-configured, may originate the IPv6 packet 290c without any SR header. When SR-IPv6 packet 292c is communicated to node D (via node C), the DA is modified by node D to include the next or second node in the SL (i.e. node G), as indicated in SR-IPv6 packet 294c. When SR-IPv6 packet 294c is further communicated to the node G (via node F), the DA is modified by node G to include the next or third node in the SL (i.e. node Z, which is the destination node) and the SR header is removed, as indicated in IPv6 packet 296c. Here, similar to the source node, the destination node may or may not be SRv6-configured.

Figure 2D:
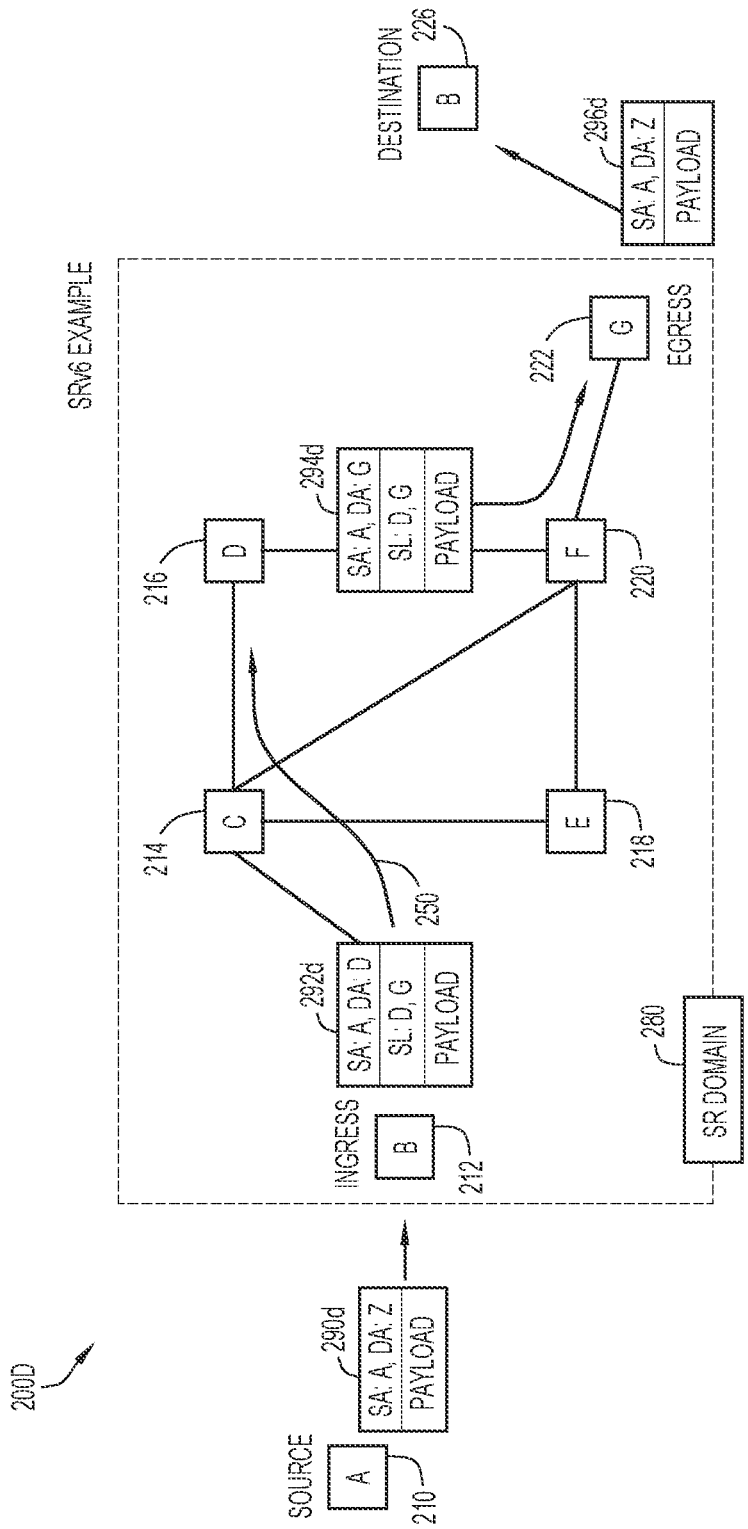

In the example associated with a communication network 200D of FIG. 2D, the source node, which may or may not be SRv6-configured, originates an IPv6 packet 290d without any SR header. The ingress node (node 212 or B) operates to encapsulate IPv6 packet 290d with a new, outer IPv6 header followed by an SR header, to produce an SR-IPv6 packet 292d. The SL of the SR header includes nodes D and G, but does not include the destination node (node 226 or Z). When SR-IPv6 packet 292d is communicated to node D (via node C), the DA is modified by node D to include the next or second node in the SL (i.e. node G), as indicated in SR-IPv6 packet 294d. When SR-IPv6 packet 294d is further communicated to the node G (via node F), the SR-IPv6 packet 294d is decapsulated by node G, which is represented by SR-IPv6 packet 296d. Here, similar to the source node, the destination node may or may not be SRv6-configured.

Note that the current state of the art for SRv6 may be further described in various standards-related documents, including Internet Engineering Task Force (IETF) documents, such as "*Segment Routing Architecture*," RFC 8402, C. Filsfils et al., July 2018; and "*IPv6 Segment Routing Header (SRH)*" identified by "draft-ietf-6man-segment-routing-header-022", C. Filsfils et al., Aug. 6, 2019.

Figure 3:
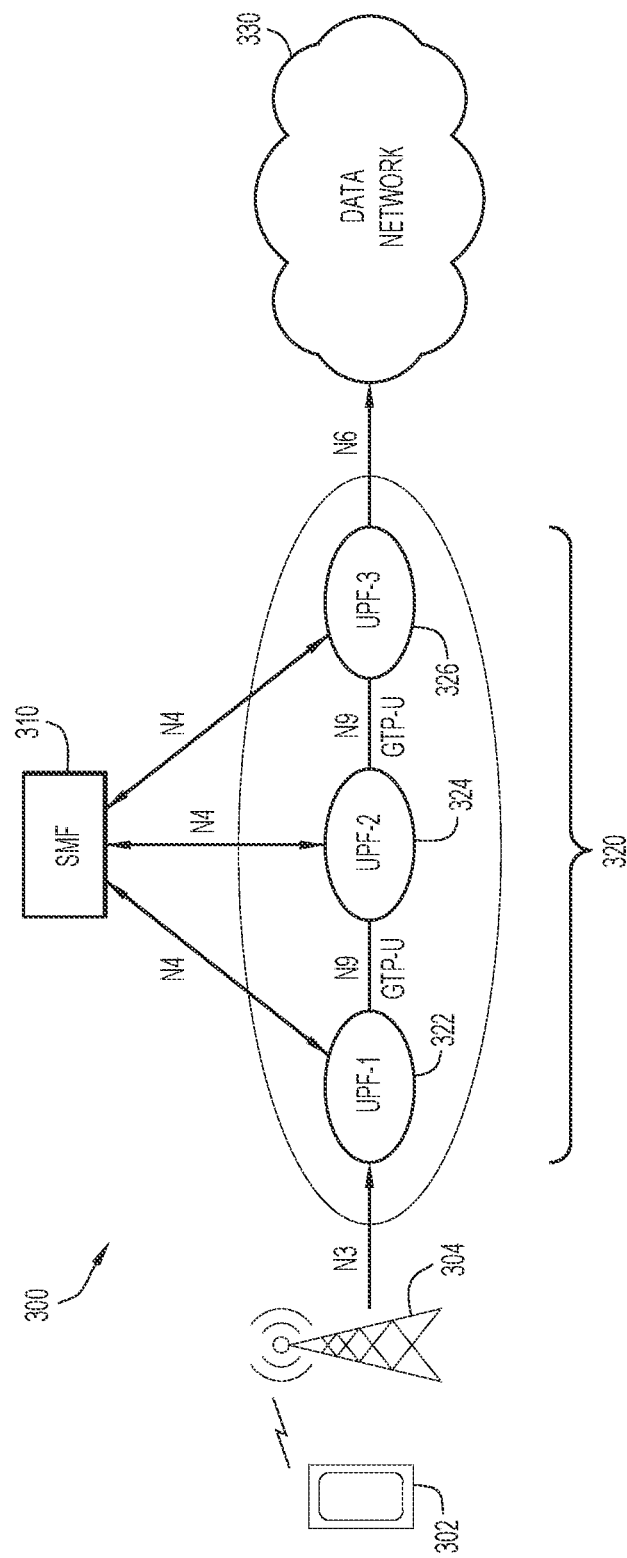
FIG. 3 is an illustrative representation of select network nodes of a network architecture of the 5G network of FIG. 1B for communicating user plane (UP) traffic through a plurality of user plane functions (UPFs) using a General Packet Radio Service (GPRS) Tunneling Protocol (GTP) UP (GTP-U) protocol.

FIG. 3 is an illustrative representation of a network node arrangement 300 of select network nodes of a 5G network according to some current proposals. The network node arrangement 300 includes a UE 302 operative in the 5G network via a gNB 304. UP traffic associated with UE 302 may be routed via a set of UPFs 320 in an N9 service chain to a data network 330. Here, the set of UPFs 320 include UPFs 322, 324, and 326. The UP traffic may be transported using GTP-u as the transport protocol. For session management, an SMF 310 may establish sessions over N4 interfaces with each one of UPFs 322, 324, and 326. The sessions may be PFCP sessions. In the PFCP sessions, the SMF may perform session management which may include sending each UPF a set of policy rules for handling UP traffic.

Given the large number of UPFs that may be utilized along the N9 service chain, N4 signaling associated with the chain of UPFs may become burdensome. This problem may be compounded as the number of UPFs in the chain increases. Further, as described in 3GPP TS 29.244, each UPF needs to locate a matching PFCP session upon receiving a data packet, for identifying a set of rules associated with a packet detection rule (PDR). Such activities slow down packet processing at each UPF in the service chain.

Figure 4:
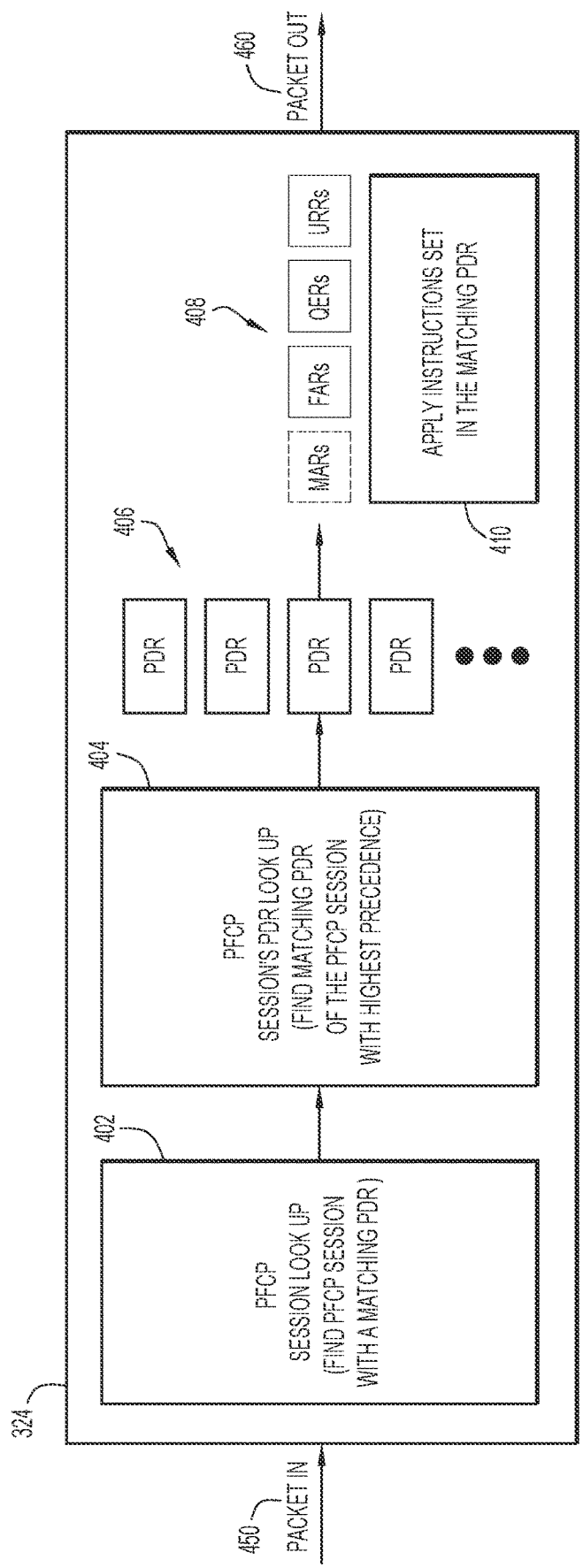
FIG. 4 is an illustrative representation of packet processing in a UPF in the network architecture of FIG. 3.

To further illustrate, FIG. 4 is an illustrative representation of packet processing in a UPF 324 in the network node arrangement 300 of FIG. 3 using the GTP-u. The packet processing shown in FIG. 4 is based on FIG. 5.2.1-1 of 3GPP TS 29.244 V16.0.0 (2019 June). Upon receiving a data packet 450, UPF 324 will locate a matching PFCP session (a process step 402) before performing a PDR lookup for identifying a set of rules associated with the PDR (a process step 404). The identified set of rules may include Forwarding Action Rules (FARs), QoS Enforcement Rules (QERs), Usage Reporting Rules (URRs), and Buffering Action Rules (BARs), etc. After selection of one of the PDRs (a process step 406), UPF 324 may apply a set of rules 408 or instruction set in relation to the data packet for processing the data packet (a process step 410), which is output from UPF 324 as a processed data packet 460. As mentioned above, these activities may slow down packet processing at each UPF along the N9 service chain.

3GPP Technical Report (TR) 29.892 is associated with the feasibility of SRv6 as an alternative to GTP-u as the new transport protocol for 5G data traffic. Without further advancements, the features of SRv6 and GTP-u as applied to the transport protocol for 5G may be deemed to be comparable to at least some. According to the present disclosure, however, leveraging particular aspects of SRv6 for 5G data traffic offers a number of real, distinct advantages. Leveraging these particular aspects may simplify the network architecture for 5G and boost UPF performance. One notable aspect relates to a unique application and use of SRv6 network programming, which can provide a significant optimization with respect to N4 signaling and a reduction in UPF processing cycles.

According to at least some implementations, SRv6 data packets for a UE may be routed and/or steered through a chain or set of UPFs as specified in a SID list of SIDs in an SRH. The SID list may be inserted in the SRH at a source UPF (or head-end UPF) of the set of UPFs. SRv6 network programing techniques may be utilized for implementing sets of policy rules on at least some of the UPFs, rules such as FARs, QERs, URRs, and BARs, etc. Using these techniques, N4 session signaling with an SMF for at least some of the UPFs may be reduced or eliminated. At least some of the UPFs may be considered to be fully or partially "stateless." SRv6 Network Programming is described generally in "*SRv6 Network Programming*" identified by draft-filsfils-spring-srv6-network-programing-01, C. Filsfils et al., Jul. 3, 2019.

Figure 7A:
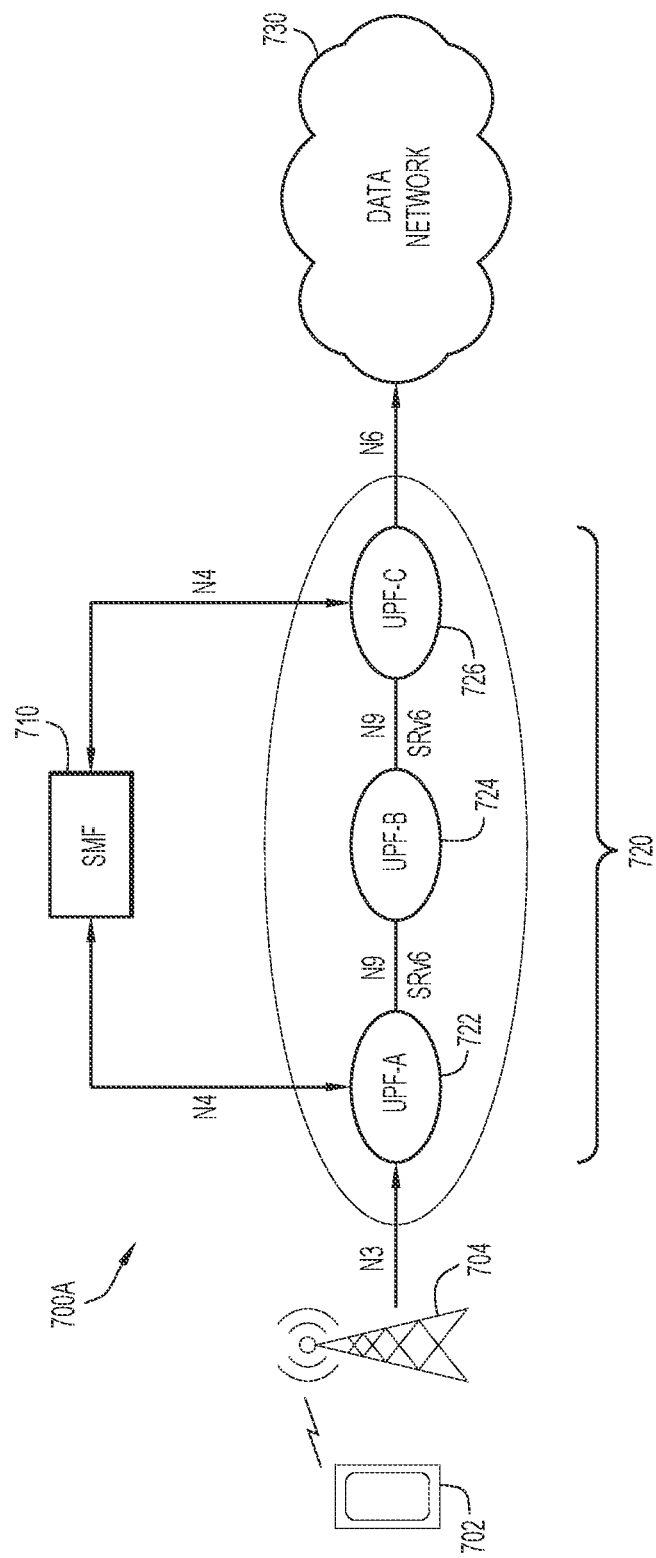
FIG. 7A is an illustrative representation of select network nodes of a network architecture of the 5G network of FIG. 1B for communicating UP traffic through a set of UPFs using the SRv6 protocol according to some implementations of the present disclosure.

Referring ahead to FIG. 7A, an illustrative representation of select network nodes of a network architecture 700A for communicating UP traffic through a set of UPFs using the SRv6 protocol according to some implementations of the present disclosure is shown. In FIG. 7A, a UE 702 is operating in the 5G network via a gNB 704 (or other type of base station or access point) for communicating SRv6 data packets which carry UP traffic data. The UP traffic data associated with UE 702 may be routed via a set of UPFs 720 which define a forwarding path (here, UPFs 722, 724, and 726) to a data network 730. The UP traffic may be transported at least in part using SRv6 as the transport protocol.

In the example shown, UPF 722 is the head-end UPF and UPF 726 is the tail-end UPF. For session management, an SMF 710 may establish sessions (e.g. PFCP sessions) over N4 interfaces with UPF 722 and 726 (i.e. the head-end and tail-end UPFs), but need not establish sessions over any N4 interface with UPF 724 (or any other intermediate UPFs between the head-end and tail-end UPFs). In the PFCP sessions, the SMF 710 may perform session management, which may include sending the head-end UPF 722 session management information indicating one or more of the set of UPFs 720 which define the forwarding path as well as a set of policy rules for handling UP traffic data for other UPFs in the set of UPFs 720 (e.g. UPF 724).

In some preferred implementations, most if not all of the UPFs in a chain of UPFs do not need to connect or establish a session with the SMF at all. In these implementations, only a source or head-end UPF and a tail-end UPF may need to have a N4 session connection with the SMF. Put another way, the SMF may refrain from establishing N4/PFCP sessions with intermediary UPFs between the head-end UPF and the tail-end UPF. Note that this efficiency may be especially advantageous when the number of UPFs in the chain is relatively large (e.g. 10 UPFs in a chain of UPFs which define a forwarding path).

Figure 7B:
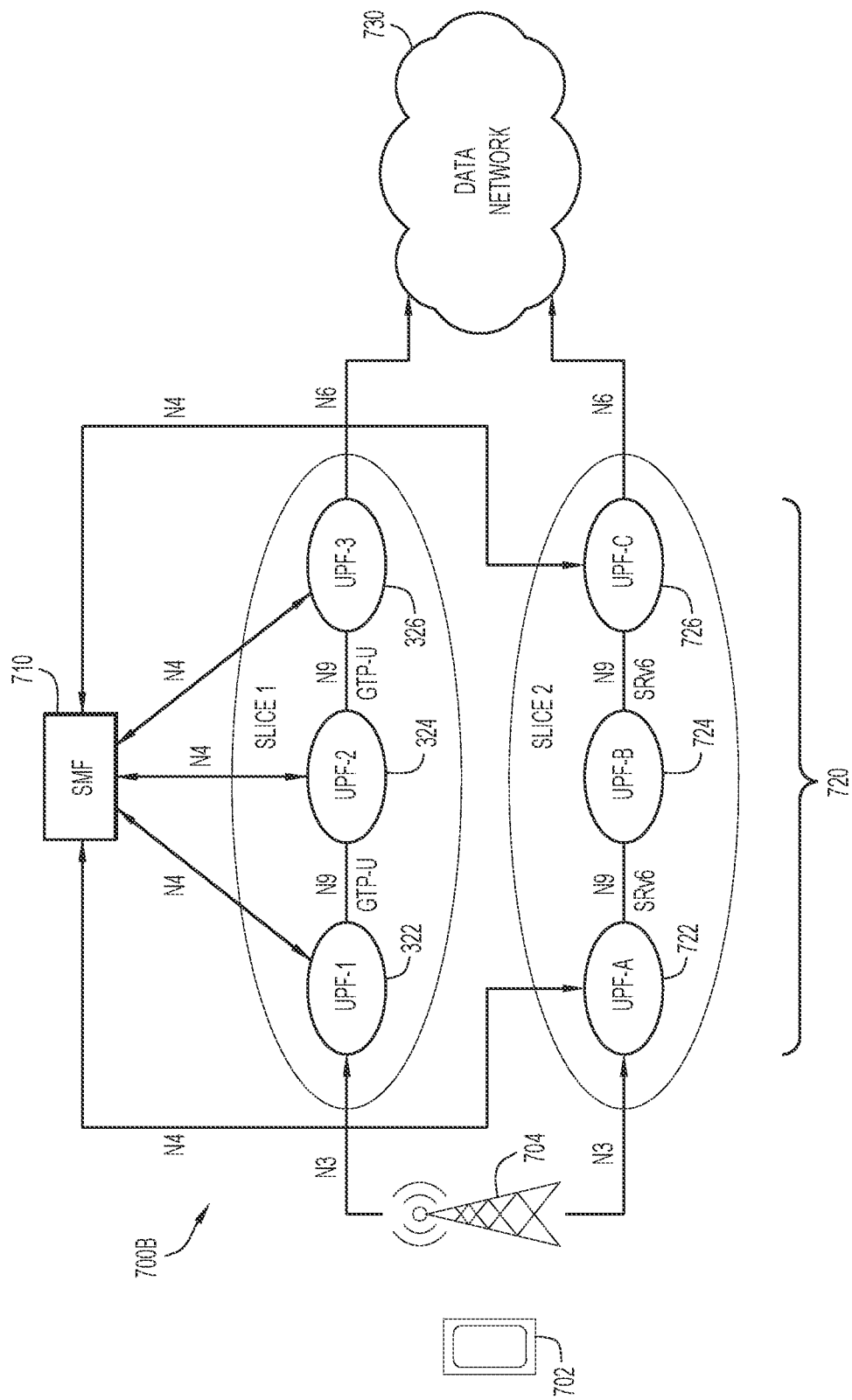
FIG. 7B is an illustrative representation of the select network nodes of the network architecture of the 5G network for communicating UP traffic through the set of UPFs using the SRv6 protocol of FIG. 5A, which may be provided together with the network architecture which utilizes the GTP-U protocol, according to some implementations of the present disclosure.

FIG. 7B is an illustrative representation of a network architecture 700B which includes the select network nodes of the network architecture using the SRv6 protocol of FIG. 7A, together with the select network nodes of the network architecture which utilizes the GTP-U protocol (FIG. 3), according to some implementations of the present disclosure. As shown in FIG. 7B, a set of UPFs of a first network slice ("Slice 1") may define a forwarding path for routing data packets using the GTP-u, whereas the set of UPFs 720 of a second network slice ("Slice 2") may define a forwarding path for routing data packets using SRv6 as described herein.

Again, an SRv6 data packet for a UE may be routed and steered through a chain or set of UPFs as specified in a SID list of SIDs in an SRH. To better illustrate, reference will now be made to FIG. 5.

Figure 5:
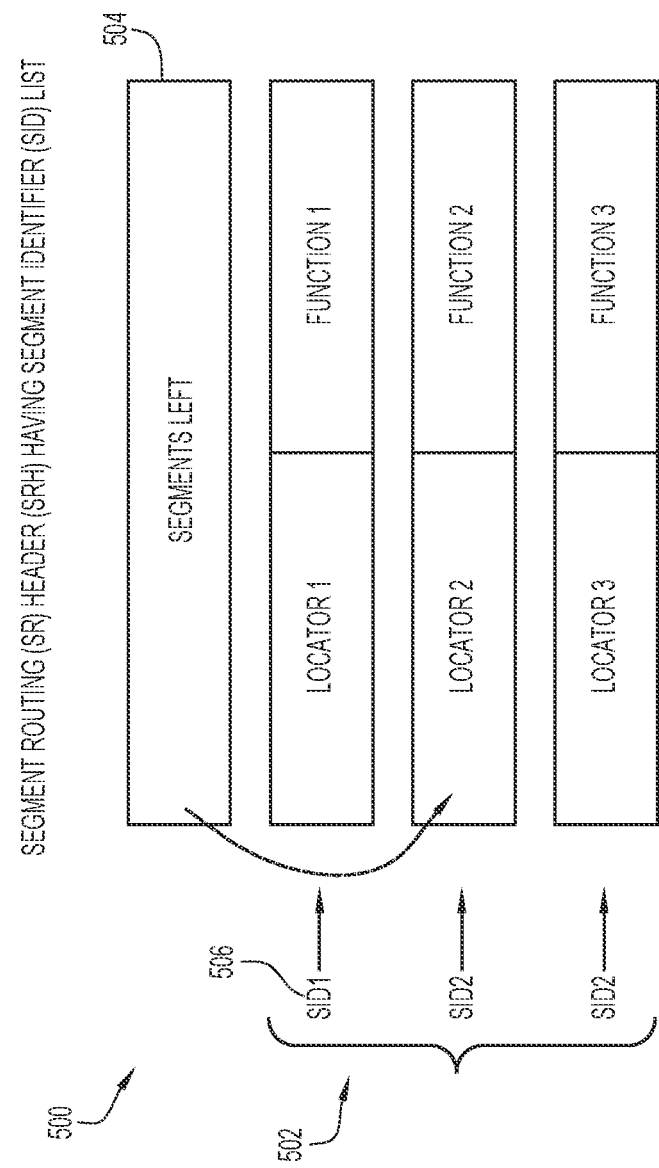
FIG. 5 is an illustrative representation of a segment routing header (SRH) of an SRv6 data packet, where the SRH includes a list of segment IDs (SIDs) each of which include a locator or address of a network node and a function to be applied at the network node.

FIG. 5 is an illustrative representation of an SRH 500 of an SRv6 data packet, where the SRH 500 includes a list of SIDs 502. As shown, each SID in the list of SIDs 502 may include a locator or address of a network node and a function to be applied at the network node. For example, a SID 506 (or "SID 1") in FIG. 5 may include a "Locator 1" and a "Function 1." In the SRH 500, "SRv6 segments" which are identified as SIDs may be encoded as IPv6 addresses. In some implementations of the present disclosure, a source (or head-end) UPF of may create and insert the SID list of the SRH in an outer encapsulating IPv6 packet.

With more detail, an SRv6 segment (e.g. an 128-bit SRv6 SID, which may be an IPv6 address) may have the following components:

Locator:Function:Arguments where "Locator" is the location of the node to route and perform the Function; "Function" is any possible function, either local to Network Processing Unit (NPU) or applications in Virtual Machine (VM)/Container; and "Arguments" are optional argument bits to be used only by that SID. Accordingly, the "Locator" may route the data packet up to a given node in the network. Once the packet arrives at this node, the "Function" may be executed. The "Function" may or may not need or take additional "Arguments" specific to that Function. Accordingly, a SID list may include a location of each UPF that connects along the N9 interface, together with an action that to be performed at each respective UPF. The ordering of the UPFs along the N9 interface for routing may be indicated by a consecutive ordering of SIDs in the SID list. SRv6 network programming may be utilized to provide appropriate functionality at the UPFs.

SRH 500 in FIG. 5 may further include an index 504 indicating a number of "segments left" in the list of SIDs 502. Upon forwarding an SRv6 data packet, a UPF may decrement the index 504 indicating the number of segments left, populate a destination address of the SRv6 data packet with the SID corresponding to the index 504 indicating the number of segments left, and forward the SRv6 data packet toward a next UPF located at the destination address.

Figure 6:
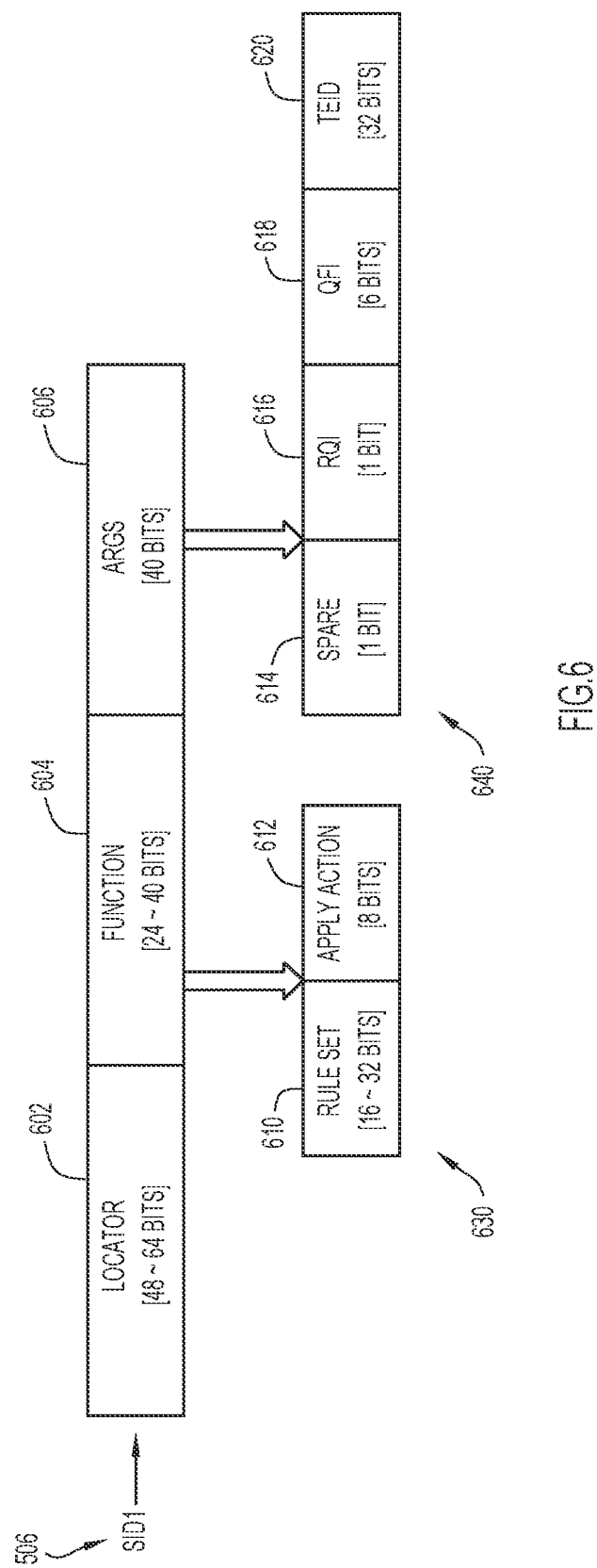
FIG. 6 is an illustrative representation of an example of one of the SIDs in a list of SIDs of an SRH of an SRv6 data packet according to some implementations, where the SID is composed of an IPv6 address having at least a first address portion and a second address portion, the first address portion indicating a location of a corresponding UPF in a set of UPFs which define a forwarding path of the IPv6 data packet in the 5G network, and the second address portion indicating one or more rules, actions, or parameters to be applied to the IPv6 data packet at the corresponding UPF in the set of UPFs indicated by the first address portion associated with the second address portion.

FIG. 6 is an illustrative representation of an example of one of the SIDs 506 ("SID 1") in a list of SIDs of an SRH of an SRv6 data packet according to some implementations. Each SID (e.g. SID 506) may be composed of an IPv6 address having at least a first address portion (a locator 602) and a second address portion (a function 604). The first address portion (i.e. locator 602) may indicate a location of a corresponding UPF in a set of UPFs which define a forwarding path of the IPv6 data packet in the 5G network. The second address portion (i.e. function 604) may indicate one or more rules, actions, or parameters 630 to be applied to the IPv6 data packet at the corresponding UPF in the set of UPFs indicated by the first address portion (i.e. locator 602) that is associated with the second address portion (i.e. function 604).

In FIG. 6, the one or more rules, actions, or parameters 630 are shown as a rule set 610 and an apply action 612. The one or more rules, actions, or parameters 630 may be or include one or more FARs, QERs, URRs, BARs, or combinations thereof. In some implementations, a third address portion (an arguments 606) of the IPv6 address of SID 506 may indicate arguments or parameters 640 for the corresponding function. Arguments or parameters 640 may include a Radio Quality Index (RQI) 616, a QoS Flow ID (QFI) 618, and a Tunnel Endpoint ID (TEID) 620, as a few examples; also shown is a reserved or spare bit(s) 614.

Accordingly, UPFs in a chain or set of UPFs may behave according to SRv6 functions (or SID functions) instructed by a head-end UPF. PFCP information may be encoded as part of the SRH as arguments in the SID, if and as needed.

Figure 7C:
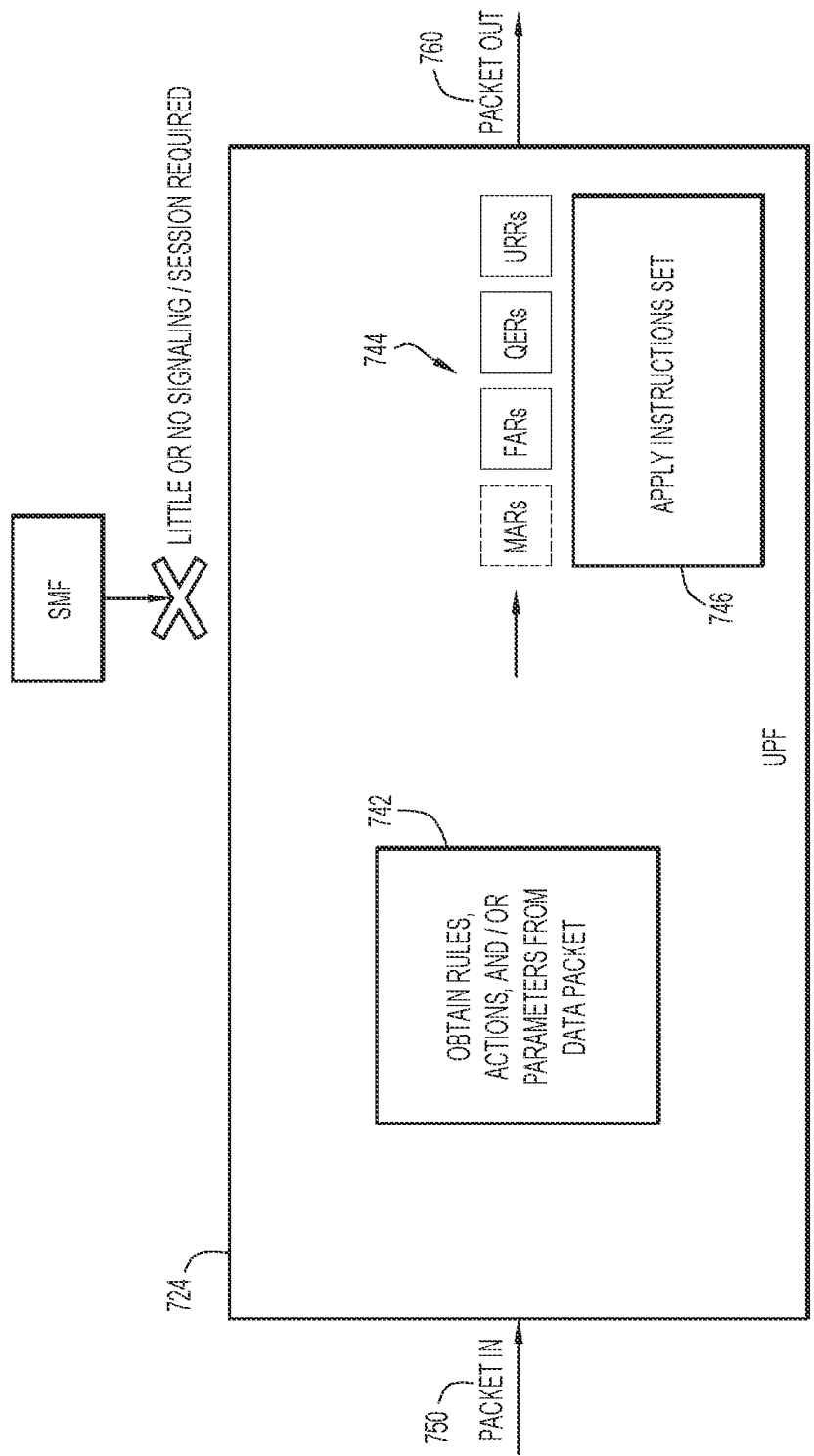
FIG. 7C is an illustrative representation of packet processing in a UPF (e.g. UPF 724) in the network architecture of FIG. 7A according to some implementations of the present disclosure.

Referring now to FIG. 7C, an illustrative representation of packet processing in a UPF in the network architecture of FIG. 7A (e.g. UPF 724 of FIG. 7A) is shown. Upon receiving a data packet 750 (i.e. an SRv6 data packet), UPF 724 does not need to locate a matching PFCP session for identifying a set of rules associated with a PDR (compare FIG. 4). Rather, UPF 726 may obtain one or more rules, actions, and/or parameters from the data packet itself (a process step 742). A set of rules or actions 744 obtained from the data packet may include FARs, QERs, URRs, and BARs, etc. UPF 724 may apply the rules or instruction set to process the data packet (a process step 746), which is output from UPF 724 as a processed data packet 760.

Figure 8:
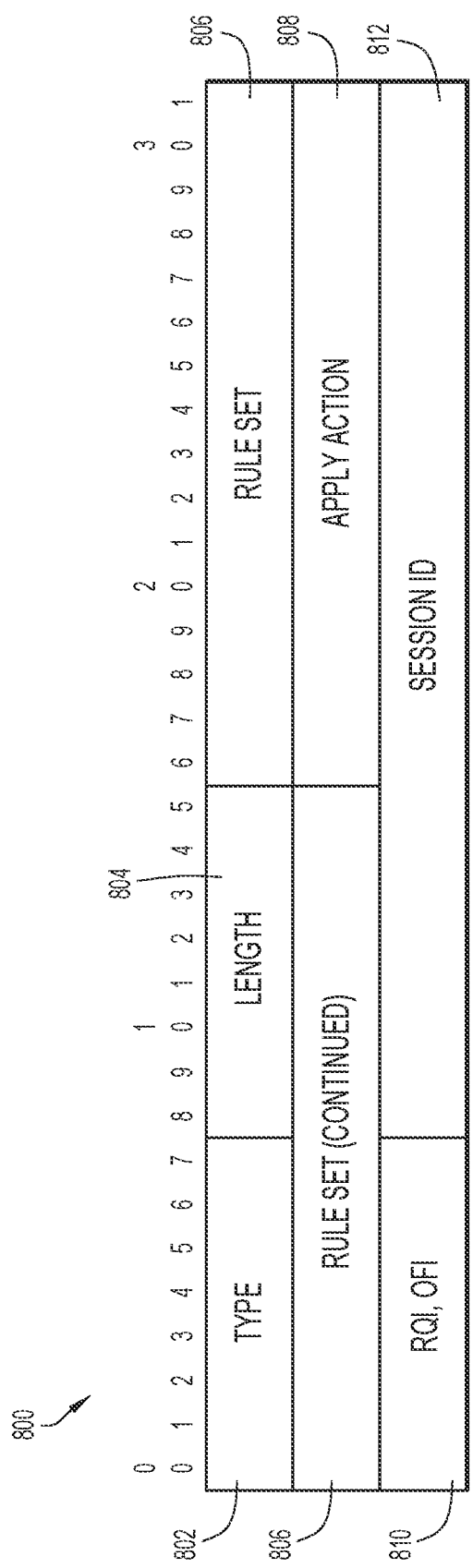
FIG. 8 is an illustrative representation of a portion of a segment routing header of an IPv6 data packet which shows a Type-Length-Value (TLV) indicating one or more rules, actions, or parameters to be applied to the IPv6 data packet, according to some implementations of the present disclosure.

In some implementations, the one or more rules, actions, parameters, and/or arguments may be alternatively provided as metadata in the form of Tags or Type-Length-Values (TLVs). FIG. 8 is an illustrative representation of a portion of a segment routing header of an IPv6 data packet which includes a TLV 800 indicating one or more rules, actions, or parameters to be applied to the IPv6 data packet, according to some implementations of the present disclosure. As shown, TLV 800 may include a type field 802, a length field 804, a rule set field 806, an apply action field 808, and one or more arguments fields 810 and 812 (e.g. RQI, QFI, TEID).

Figure 9:
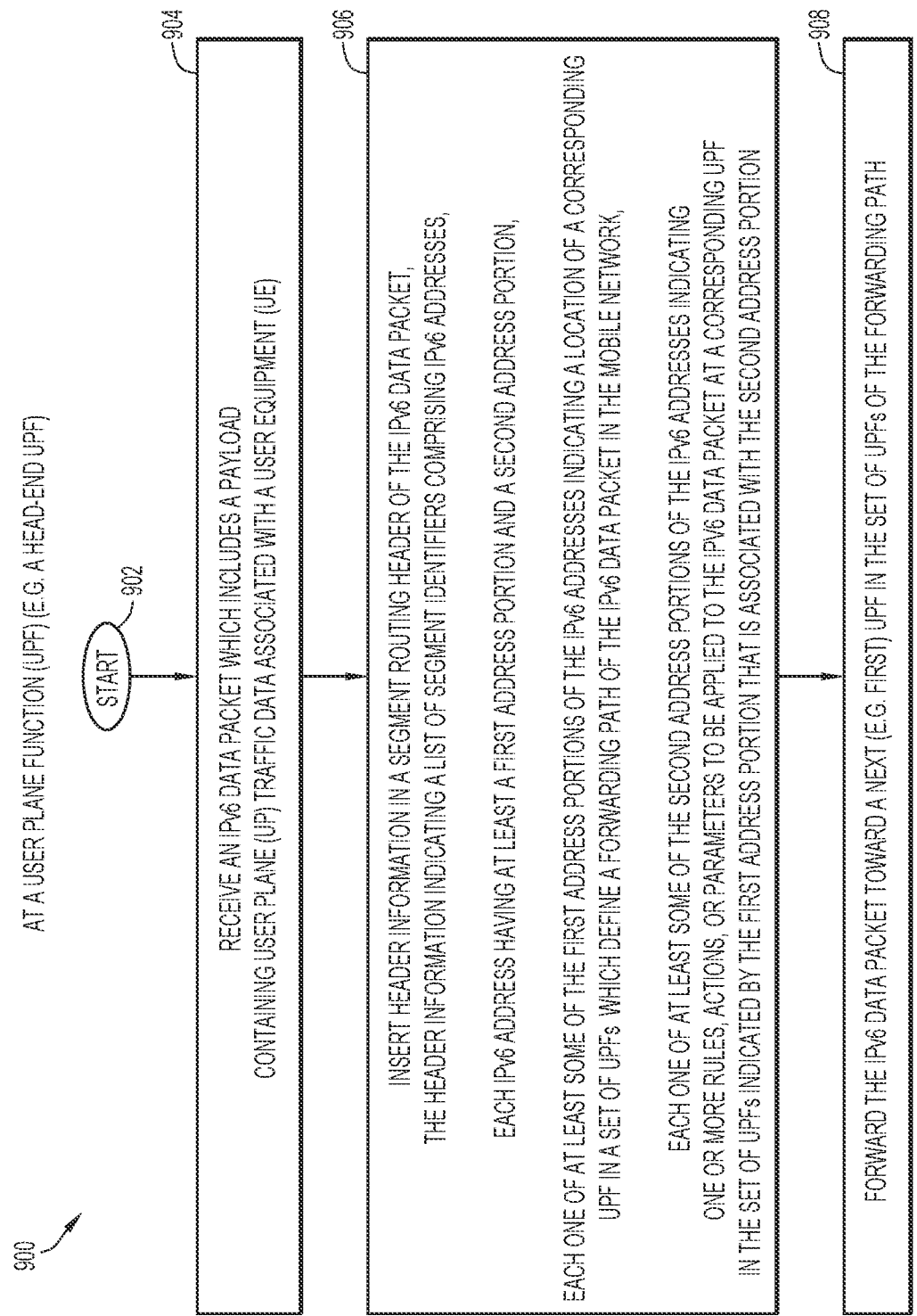
FIGS. 9-10 are flowcharts for describing methods for use in processing and forwarding data packets of a communication associated with a UE, which may be performed by a UPF, according to some implementations of the present disclosure.

FIG. 9 is a flowchart 900 for describing a method for use in processing and forwarding data packets of a communication associated with a UE, which may be performed by a UPF, according to some implementations of the present disclosure. In FIG. 9, the UPF may be a head-end UPF (e.g. UPF 722 of FIG. 7A). The UPF may include one or more processors, memory, and one or more network interfaces, where the one or more processors are configured to perform the steps of the method. The method may be embodied as a computer program product which includes a non-transitory computer readable medium and computer instructions stored in the non-transitory computer readable medium, where the computer instructions are executed by one or more processors of the UPF of the mobile network.

Beginning at a start block 902 of FIG. 9, the UPF may receive an IPv6 data packet which includes a payload containing UP traffic data associated with a UE (step 904 of FIG. 9). For example, the IPv6 data packet may be received at the UPF via the N3 interface. The IPv6 data packet may be an SRv6 data packet. The UPF may create a segment routing header (e.g. an SRH) and insert header information in the segment routing header of the IPv6 data packet, where the header information indicates a list of segment identifiers comprising IPv6 addresses (step 906 of FIG. 9). The header information may correspond to or be based on session management information received from a CP entity for session management, such as an SMF, over a session such as a PFCP session. Each IPv6 address may have at least a first address portion and a second address portion. Each one (e.g. of at least some) of the first address portions of the IPv6 addresses may indicate a location of a corresponding UPF in a set of UPFs which define a forwarding path of the IPv6 data packet in the mobile network. Further, each one (e.g. of at least some) of the second address portions of the IPv6 addresses may indicate one or more rules, actions, or parameters to be applied to the IPv6 data packet at the corresponding UPF in the set of UPFs indicated by the first address portion that is associated with the second address portion. Additionally or alternatively, the UPF may insert one or more rules, actions, or parameters in one or more TLVs of the segment routing header. The one or more rules, actions, or parameters may be or include one or more FARs, BARs, QERs, URRs, or combinations thereof. In some implementations, the functions may be implemented as SID or SID-based functions which may be provisioned at the UPFs. Additionally or alternatively, the one or more rules, actions, or parameters comprise a QFI, a RQI, or both. The UPF may forward the IPv6 data packet toward a next UPF in the set of UPFs (step 908 of FIG. 9). The forwarding of the IPv6 data packet may be performed according to the one or more rules, actions, or parameters.

Figure 10:
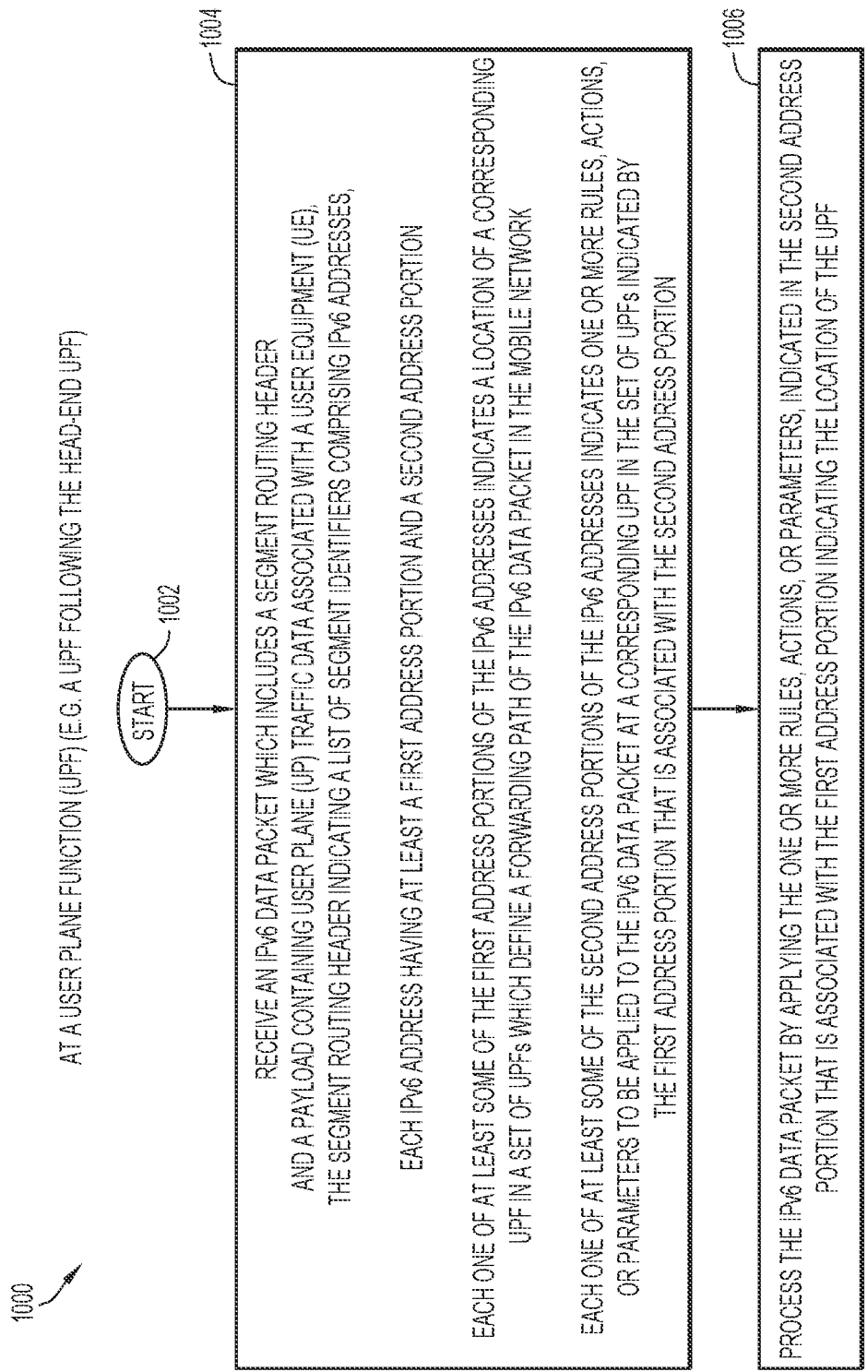

FIG. 10 is a flowchart 1000 for describing a method for use in processing and forwarding data packets of a communication associated with a UE, which may be performed UPF, according to some implementations of the present disclosure. In FIG. 10, the UPF may be a UPF which follows the head-end UPF, and may be considered an intermediate UPF (e.g. UPF 724 of FIG. 7A). The UPF may include one or more processors, memory, and one or more network interfaces, where the one or more processors are configured to perform the steps of the method. The method may be embodied as a computer program product which includes a non-transitory computer readable medium and computer instructions stored in the non-transitory computer readable medium, where the computer instructions are executed by one or more processors of the UPF of the mobile network.

Beginning at a start block 1002 of FIG. 10, the UPF may receive an IPv6 data packet which includes a segment routing header and a payload containing UP traffic data associated with a UE (step 1004 of FIG. 10). For example, the IPv6 data packet may be received at the UPF via the N9 interface. The IPv6 data packet may be an SRv6 data packet. The segment routing header may include header information indicating a list of segment identifiers comprising IPv6 addresses. Each IPv6 address may have at least a first address portion and a second address portion. Each one of at least some of the first address portions of the IPv6 addresses indicates a location of a corresponding UPF in a set of UPFs which define a forwarding path of the IPv6 data packet in the mobile network. Further, each one of at least some of the second address portions of the IPv6 addresses indicates one or more rules, actions, or parameters to be applied to the IPv6 data packet at the corresponding UPF in the set of UPFs indicated by the first address portion that is associated with the second address portion. Additionally or alternatively, the segment routing header may indicate one or more rules, actions, or parameters in one or more TLVs of the segment routing header. The one or more rules, actions, or parameters may be or include one or more FARs, BARs, QERs, URRs, or combinations thereof. Additionally or alternatively, the one or more rules, actions, or parameters comprise a QFI, a RQI, or both. The UPF may process the IPv6 data packet by applying the one or more rules, actions, or parameters, indicated in the second address portion that is associated with the first address portion indicating the location of the UPF (step 1006 of FIG. 10). In some implementations, the functions for processing may be implemented as SID or SID-based functions which may be provisioned at the UPFs. In some other implementations, the UPF may refrain from maintaining any PFCP session information in memory for the UE (e.g. being fully or partially "stateless").

One or more advantages may be achieved using techniques and mechanisms of the present disclosure. Using SRv6 network programmability, the number of N4 sessions or connections may be reduced and/or session signaling may be decreased. This may provide benefits in performance for both the SMF and the UPF. An overall signaling optimization is provided in implementations where (e.g. only) the head-end and tail-end UPFs are provided with N4/PFCP sessions. Other (intermediary) UPFs may be considered to be "stateless." Further, as the SID list may include a defined action for each UPF for a packet that passes through it, the UPF does not need to perform a PFCF session search and subsequent PDR lookup to decide on the appropriate action (e.g. compare with GTP-u solution). Thus, processing at the UPF may be made more simple and efficient. Performance of the UPF may be significantly boosted and signaling latency may be improved as well.

In some further implementations, the path for UP traffic may be dynamically changed or switched (e.g. "on-the-fly") among different UPFs based on link quality, in order to maintain or achieve a (consistent) end-to-end Service Level Agreement (SLA) (e.g. an SLA for low latency service). As SR removes state from the network, upon a change in link conditions, UP traffic data may be switched over to a different stateless UPF to maintain or achieve a tight end-to-end SLA. In some of these implementations, most or all UPFs along the path may record link quality information, so that the return path may be optimized by the tail-end UPF.

Any possible metadata that UPFs may use for packet processing may be encoded. Examples may include encoding radio/transport link conditions for smart processing at enhanced UPFs upon changes on radio/link conditions.

In some other implementations, in the event of UPF failure, UP traffic may be dynamically re-routed to another (e.g. backup) UPF without dropping (or minimizing the dropping of) the UP traffic. Such dynamic re-routing may be considered to be a relatively fast re-routing of UP traffic (e.g. under 50 milliseconds). Here, an SRv6 function may easily be identified and executed in a backup UPF, as the SRv6 packet may include the specific function that the UPF has to execute. The backup UPF need not store any PFCP/PDR information locally, as most or all of it may be conveyed in the SRv6 packet. This mechanism may be extended to support a case of a high-loading of UPFs, where new UPFs may be immediately "spinned up" without the need for traditional session signaling. In some of these implementations, the UPFs may be instantiated in a public cloud as public cloud instances (e.g. AWS, Azure, Alibaba, etc.), or in a public-cloud virtual machine (VM) without any N4 interface.

Figure 11A:
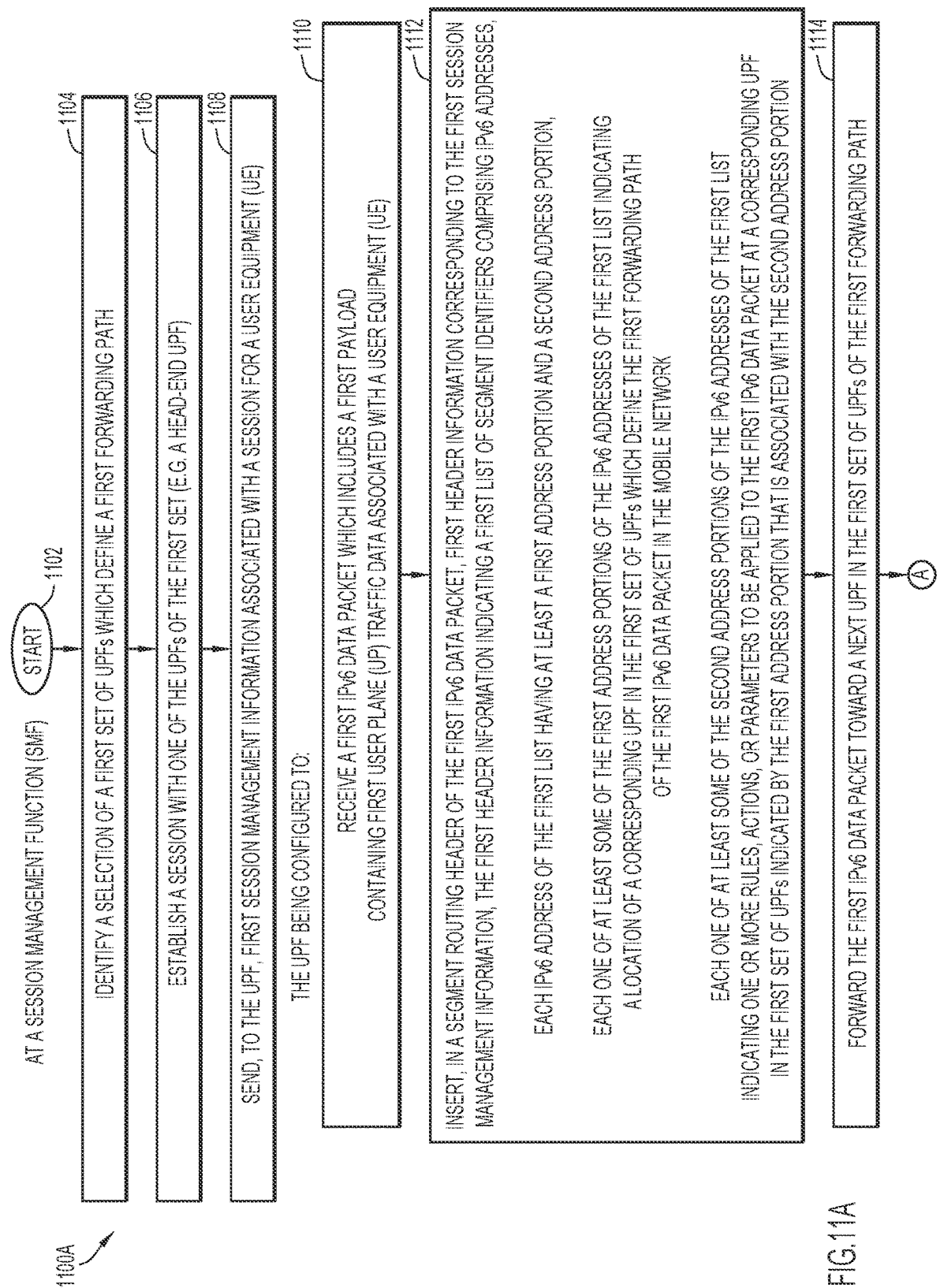

For use in describing such dynamic re-routing or switching, FIGS. 11A-11B are flowcharts 1100A and 1100B, respectively, for describing methods for use in processing and forwarding data packets of a communication associated with a UE, which may be performed by a CP entity for session management, such as an SMF, according to some implementations of the present disclosure. The SMF may include one or more processors, memory, and one or more network interfaces, where the one or more processors are configured to perform the steps of the method. The method may be embodied as a computer program product which includes a non-transitory computer readable medium and computer instructions stored in the non-transitory computer readable medium, where the computer instructions are executed by one or more processors of the SMF of the mobile network.

Beginning at a start block 1102 of FIG. 11A, the SMF may identify a selection of a first set of UPFs which define a first forwarding path (step 1104 of FIG. 11A). The SMF may establish a session with one of the UPFs in the first set (e.g. a head-end UPF, such as UPF 722 of FIG. 7A) (step 1106 of FIG. 11A). The session may be a PFCP session. During the session, SMF may send to the UPF first session management information associated with a session of a UE (step 1108 of FIG. 11A). Here, the UPF may be configured to receive and store the first session management information in its memory.

The UPF may be further configured to receive a first IPv6 data packet which includes a payload containing UP traffic data associated with the UE (step 1110 of FIG. 11A). The UPF may be further configured to insert, in a segment routing header of the first IPv6 data packet, first header information corresponding to the first session management information (step 1112 of FIG. 11A). The first header information may indicate a first list of segment identifiers comprising IPv6 addresses, where each IPv6 address has at least a first address portion and a second address portion. Each one (e.g. of at least some) of the first address portions of the IPv6 addresses may indicate a location of a corresponding UPF in the first set of UPFs which define the first forwarding path of the first IPv6 data packet in the mobile network. Further, each one (e.g. of at least some) of the second address portions of the IPv6 addresses may indicate one or more rules, actions, or parameters to be applied to the first IPv6 data packet at the corresponding UPF in the first set of UPFs indicated by the first address portion that is associated with the second address portion. The UPF may forward the first IPv6 data packet toward a next (e.g. first) UPF in the first set of UPFs along the first forwarding path (step 1114 of FIG. 11A).

Continuing with the flowchart 1100B of FIG. 11B through a connector "A," the SMF may identify a selection of a second set of UPFs which define a second forwarding path (step 1116 of FIG. 11B). The second set of UPFs may include at least one new UPF to replace at least one existing UPF in the first set of UPFs. During the session, the SMF may send to the UPF second session management information associated with the session of the UE (step 1118 of FIG. 11B). The second session management information may indicate at least the second set of UPFs or the at least one new UPF. Here, the UPF may be configured to receive and store the second session management information in its memory.

In some implementations, the at least one existing UPF may be replaced with the at least one new UPF based on an indication or metric of link quality, congestion, loading, or availability associated with the at least one existing UPF. The indication or metric of link quality, congestion, loading, or availability associated with the at least one existing UPF may be identified from a segment routing header or TLV list in one of more data packets associated with the session for the UE. The indication or metric of link quality, congestion, loading, or availability may be inserted in a segment routing header or TLV of the one or more data packets by the UPFs. Thus, a UPF may be further configured to insert, in the segment routing header or a TLV of the data packet, a metric indicating one of link quality, congestion, loading, or availability at the UPF, where the metric is part of a list of metrics in the segment routing header or TLV list, for use in optimizing the forwarding path for UP traffic data associated with the UE.

The UPF may be further configured to receive a second IPv6 data packet which includes a payload containing UP traffic data associated with the UE (step 1120 of FIG. 11B). The second IPv6 data packet may be part of the same communication and/or follow the first IPv6 data packet (FIG. 11A). The UPF may be further configured to insert, in a segment routing header of the second IPv6 data packet, second header information corresponding to the second session management information (step 1122 of FIG. 11B). The second header information may indicate a second list of segment identifiers comprising IPv6 addresses, where each IPv6 address of the second list has at least a first address portion and a second address portion. Each one (e.g. at least some) of the first address portions of the second IPv6 addresses of the second list may indicate a location of a corresponding UPF in the second set of UPFs which define the second forwarding path of the second IPv6 data packet in the mobile network. Further, each one (e.g. of at least some) of the second address portions of the IPv6 addresses of the second list may indicate one or more rules, actions, or parameters to be applied to the second IPv6 data packet at the corresponding UPF in the second set of UPFs indicated by the first address portion that is associated with the second address portion. The UP may be further configured to forward the second IPv6 data packet toward a next UPF in the second set of UPFs along the second forwarding path (step 1124 of FIG. 11B).

For use in further describing dynamic re-routing or switching, FIGS. 12A, 12B, 12C, and 12D are illustrative representations of network node arrangements 1200A, 1200B, 1200C, and 1200D, respectively, in a 5G network for use in illustrating different forwarding paths of data packets of a communication associated with a UE. In FIGS. 12A-12D, each different forwarding path is defined by a different set of UPFs in the 5G network. The different forwarding paths in FIGS. 12A-12D are shown to better illustrate the methods described in relation to FIGS. 11A-11B.

Figure 12A:
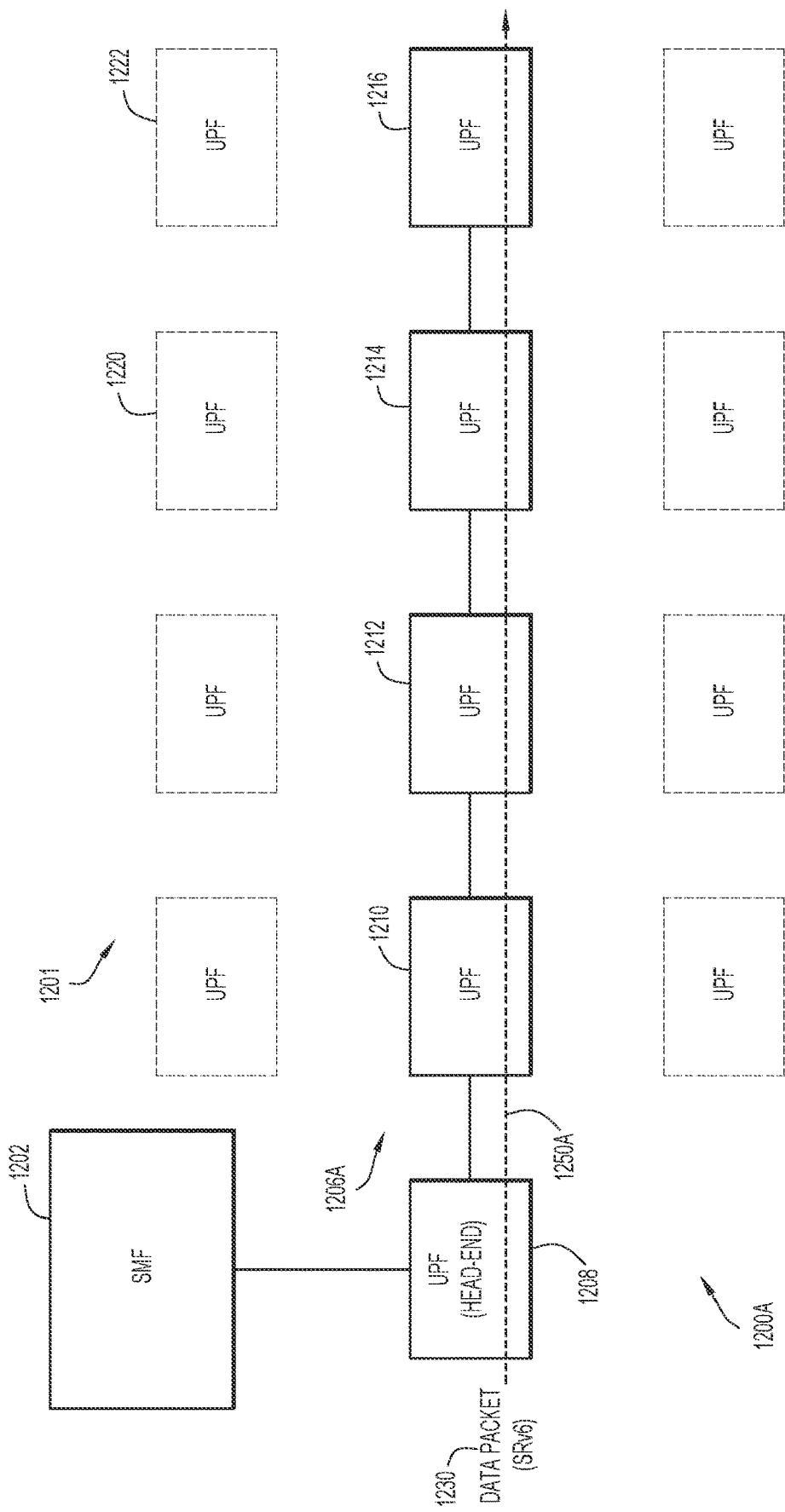
FIGS. 12A-12D are illustrative representations of network node arrangements in a 5G network for use in illustrating different forwarding paths of data packets of a communication associated with a UE.

With reference to FIG. 12A, the network node arrangement 1200A includes an SMF 1202 and a plurality of candidate UPFs 1201 for use in a 5G network. The plurality of candidate UPFs 1201 include at least a UPF 1210, a UPF 1212, a UPF 1214, a UPF 1216, a UPF 1220, and a UPF 1222.

SMF 1202 may select or identify a selection of a first set of UPFs 1206A which define a first forwarding path 1250A through which data packets containing UP traffic data associated with a UE should be communicated. In the present example, the first set of UPFs 1206A include UPFs 1210, 1212, 1214, and 1216. If not established previously, SMF 1202 may establish a session (e.g. a PFCP session) with a head-end UPF 1208. In the session, SMF 1202 may send the head-end UPF 1208 first session management information associated with a session of a UE. The first session management information may indicate the first set of UPFs 1206A which define the first forwarding path 1250A, as well as one or more rules, actions, and/or parameters associated with each UPF in the first set.

Head-end UPF 1208 may receive and store this first session management information in memory. Upon receipt of a data packet 1230 associated with the UE, head-end UPF 1208 may insert first header information in a segment routing header of data packet 1230, where the first header information corresponds to the first session management information stored in its memory. The first header information in data packet 1230 will cause the data packet 1230 to be steered through the first set of UPFs 1206A which define the first forwarding path 1250A, where each UPF in the first set applies its corresponding one or more rules, actions, and/or parameters obtained from the segment routing header of data packet 1230.

Figure 12B:
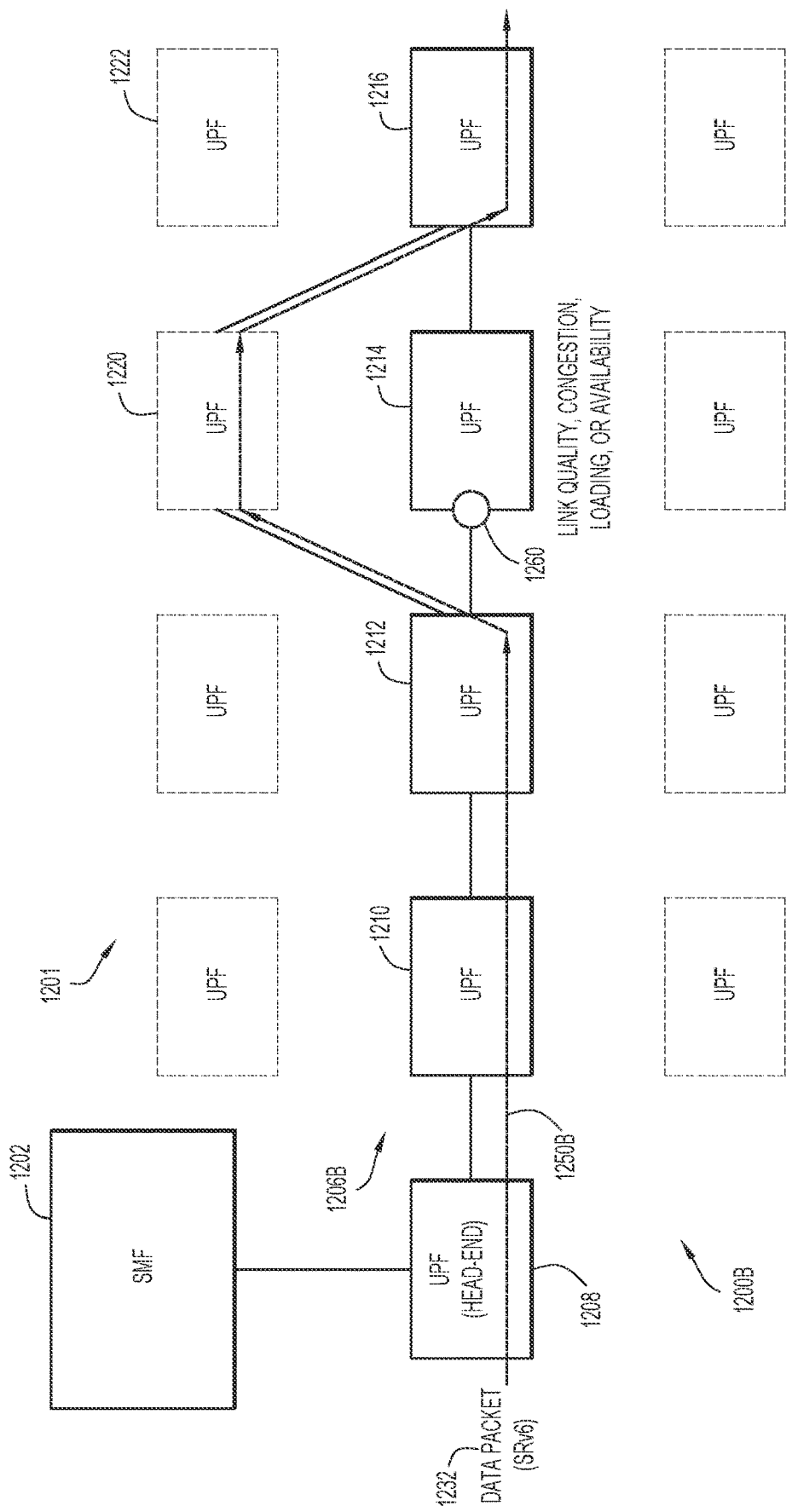

With reference now to FIG. 12B, SMF 1202 may identify a selection of a second set of UPFs 1206B which define a second forwarding path 1250B. The second set of UPFs 1206B may include at least one new UPF (e.g. UPF 1220) to replace at least one existing UPF (e.g. UPF 1214) in the first set of UPFs. SMF 1202 may send to head-end UPF 1208 second session management information associated with the session for the UE. The second session management information may indicate the at least one new UPF (e.g. UPF 1220) and or the (full) second set of UPFs 1206B, as well as one or more rules, actions, and/or parameters associated with each UPF in the second set. In the session, SMF 1202 may send the head-end UPF 1208 second session management information associated with the session of the UE. The second session management information may indicate the second set of UPFs 1206B which define the second forwarding path 1250B, as well as one or more rules, actions, and/or parameters associated with each UPF in the second set.

Head-end UPF 1208 may receive and store this second session management information in memory. Head-end UPF 1208 may receive a data packet 1232 of the session associated with the UE (e.g. where data packet 1232 is part of the same communication and follows data packet 1230 of FIG. 12B). Upon receipt of data packet 1232 associated with the UE, head-end UPF 1208 may insert second header information in a segment routing header of data packet 1232, where the second header information corresponds to the second session management information stored in its memory. The second header information in data packet 1232 will cause the data packet 1232 to be steered through the second set of UPFs 1206B which define the second forwarding path 1250B, where each UPF in the second set applies its corresponding one or more rules, actions, and/or parameters obtained from the segment routing header of data packet 1232.

As described in relation to FIG. 12B, the second set of UPFs 1206B may include at least one new UPF (e.g. UPF 1220) to replace at least one existing UPF (e.g. UPF 1214) in the first set of UPFs. The at least one existing UPF (e.g. UPF 1214) may be replaced with the at least one new UPF (e.g. UPF 1220) based on an indication 1260 (or metric) of link quality, congestion, loading, or availability associated with UPF 1214. The indication 1260 (or metric) of link quality, congestion, loading, or availability associated with UPF 1214 may be identified from the segment routing header or TLV list in one of more data packets associated with the session for the UE. The indication 1260 of link quality, congestion, loading, or availability associated with UPF 1214 may be inserted in the segment routing header of the one or more data packets by UPF 1214. The determination to include the at least one new UPF (e.g. UPF 1220) to replace the at least one existing UPF (e.g. UPF 1214) may be made by SMF 1202, an NRF, and/or a data analytics function (DAF) such as a Network DAF (NWDAF) of the 5G network. Relatively fast switching is indeed feasible, even "on-the-fly," since, for example, UPF 1220 is configured to process data packet 1232 by applying the corresponding one or more rules, actions, and/or parameters obtained from the segment routing header of data packet 1232 (i.e. no pre-stored rules, actions, and/or parameters need to be stored in such UPFs).

Figure 12C:
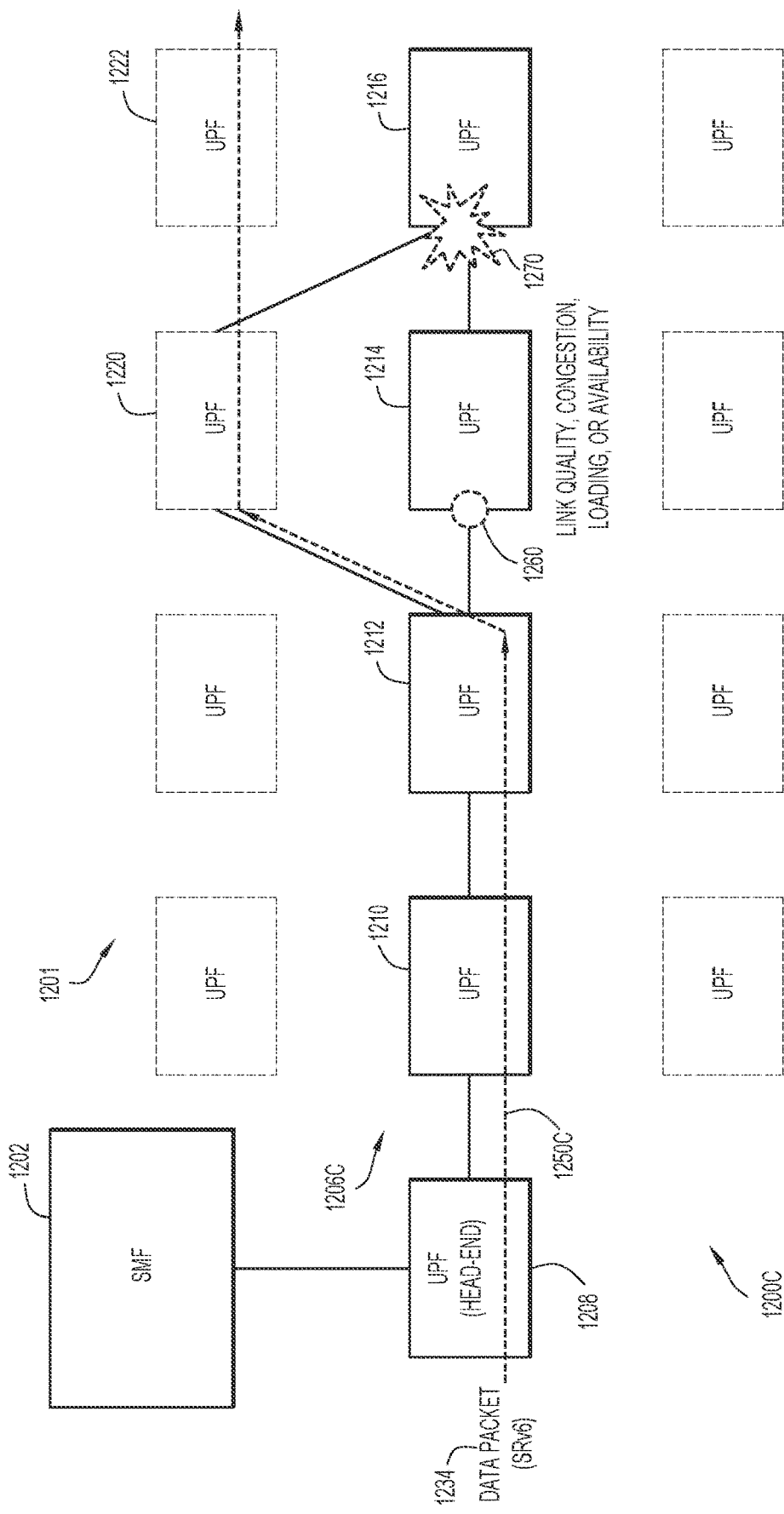

With reference now to FIG. 12C, SMF 1202 may identify a selection of a third set of UPFs 1206C which define a third forwarding path 1250C. The third set of UPFs 1206C may include at least one new UPF (e.g. UPF 1222) to replace at least one existing UPF (e.g. UPF 1216) in the second set of UPFs. SMF 1202 may send to head-end UPF 1208 third session management information associated with the session for the UE. The third session management information may indicate the at least one new UPF (e.g. UPF 1222) and or the (full) third set of UPFs 1206C, as well as one or more rules, actions, and/or parameters associated with each UPF in the third set. In the session, SMF 1202 may send the head-end UPF 1208 third session management information associated with the session of the UE. The third session management information may indicate the third set of UPFs 1206C which define the third forwarding path 1250C, as well as one or more rules, actions, and/or parameters associated with each UPF in the third set.

Head-end UPF 1208 may receive and store this third session management information in memory. Head-end UPF 1208 may receive a data packet 1234 of the session associated with the UE (e.g. where data packet 1234 is part of the same communication and follows data packet 1232 of FIG. 12C). Upon receipt of data packet 1234 associated with the UE, head-end UPF 1208 may insert third header information in a segment routing header of data packet 1234, where the third header information corresponds to the third session management information stored in its memory. The third header information in data packet 1234 will cause the data packet 1234 to be steered through the third set of UPFs 1206C which define the third forwarding path 1250C, where each UPF in the third set applies its corresponding one or more rules, actions, and/or parameters obtained from the segment routing header of data packet 1234.

As described in relation to FIG. 12C, the third set of UPFs 1206C may include at least one new UPF (e.g. UPF 1222) to replace at least one existing UPF (e.g. UPF 1216) in the second set of UPFs. The at least one existing UPF (e.g. UPF 1216) may be replaced with the at least one new UPF (e.g. UPF 1222) based on an indication 1270 of unavailability of UPF 1216. For example, UPF 1216 may be determined to be "down" or out-of-service. Relatively fast switching is indeed feasible, even "on-the-fly," since, for example, UPF 1222 is configured to process data packet 1234 by applying the corresponding one or more rules, actions, and/or parameters obtained from the segment routing header of data packet 1234 (i.e. no pre-stored rules, actions, and/or parameters need to be stored in such UPFs).

In some further implementations, "anycast" IPv6 addressing techniques and mechanisms may be applied for dynamic routing or steering of data packets using SRv6. In general, anycast is a network addressing and routing methodology in which a single destination address may be associated with multiple routing paths. Routing entities may select a desired path based on a number of hops, distance, least cost, congestion, latency, or the like. In such implementations, a set of UPFs may be assigned to and share the same anycast IPv6 address. In some implementations, an anycast IPv6 address may be assigned to a set of UPFs in addition to the assignment of uniquely-identifying IP addresses of the UPFs. Here, a data packet may include a SID comprised of an anycast IPv6 address associated with the set of UPFs. With anycast IPv6 addressing, the data packet may be dynamically routed or steered to any one of the UPFs in the set, where the UPF may perform packet processing based on header information in the SRv6 packet. In some implementations, the anycast IPv6 addressing techniques and mechanisms may be extended to enable load balancing (e.g. in a datacenter infrastructure) where most or all of UPFs may be virtualized. Depending on the complexity of a monitoring agent, UP traffic may be sent in a "smart" fashion, where the UPFs process SRv6 packets based on the header information.

Figure 12D:
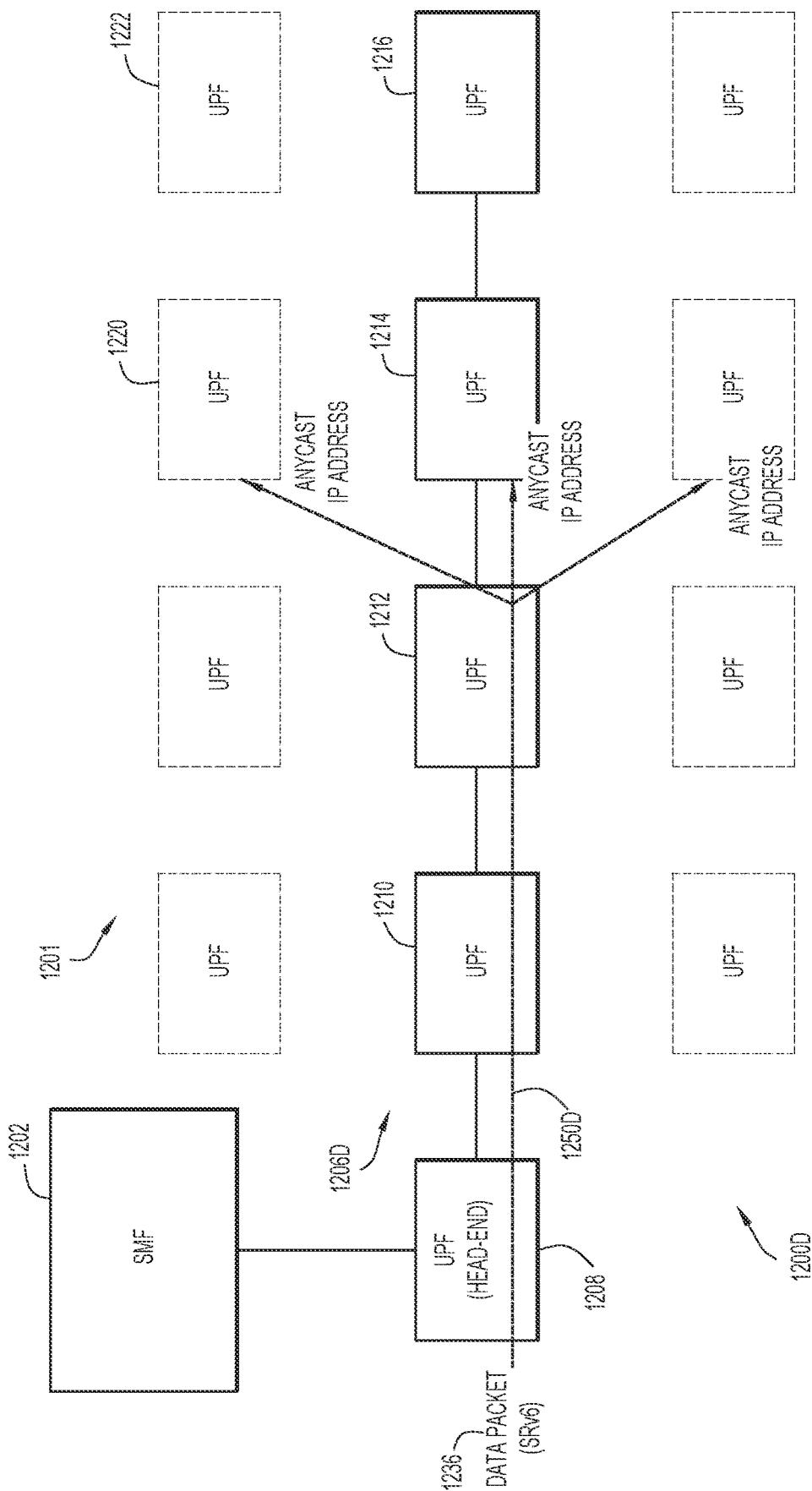

With reference to FIG. 12D, data packets containing UP traffic data may be dynamically steered or routed to UPFs using "anycast" IPv6 addressing. SMF 1202 may select or identify a selection of a set of UPFs 1206D which define a forwarding path 1250D through which data packets containing UP traffic data associated with a UE should be communicated. In the present example, the set of UPFs 1206D may include at least UPFs 1210 and 1212. SMF 1202 may establish a session (e.g. a PFCP session) with head-end UPF 1208. In the session, SMF 1202 may send the head-end UPF 1208 session management information associated with a session of a UE. The session management information may indicate the set of UPFs 1206D which define the forwarding path 1250D, as well as one or more rules, actions, and/or parameters associated with each UPF in the set. Again, at least some UPFs in the set of UPFs 1206D may be assigned with anycast IPv6 addresses. For example, UPFs 1214 and 1220 and other UPFs may be assigned with the same anycast IPv6 address.

Head-end UPF 1208 may receive and store this session management information in memory. Upon receipt of a data packet 1236 associated with the UE, head-end UPF 1208 may insert header information in a segment routing header of data packet 1236, where the header information corresponds to the session management information stored in its memory. The header information in data packet 1236 will cause the data packet 1236 to be steered through the set of UPFs 1206D which define the forwarding path 1250D, where each UPF in the set applies its corresponding one or more rules, actions, and/or parameters obtained from the segment routing header of data packet 1236. When data packet 1236 reaches UPF 1212 and is to be forwarded from UPF 1212, anycast IPv6 address processing will cause data packet 1236 to be forwarded to any one of UPFs 1214, 1220, or other. Relatively fast switching is indeed feasible, even "on-the-fly," since, for example, any one of the UPFs may be configured to process data packet 1236 by applying its corresponding one or more rules, actions, and/or parameters obtained from the segment routing header of data packet 1236 (i.e. no pre-stored rules, actions, and/or parameters need to be stored in theses UPFs). From one of UPFs 1214, 1220, or other, data packet 1236 may be forwarded further according to additional anycast IPv6 addressing, in the same or similar manner.

Accordingly, using SRv6 for 5G traffic as described herein, state and signaling may be reduced or removed. The mechanisms may provide operational expenditure (OPEX) savings and enable new use-cases, including Ultra-reliable low latency communication (URLLC), for mobile network operators.

Figure 13:
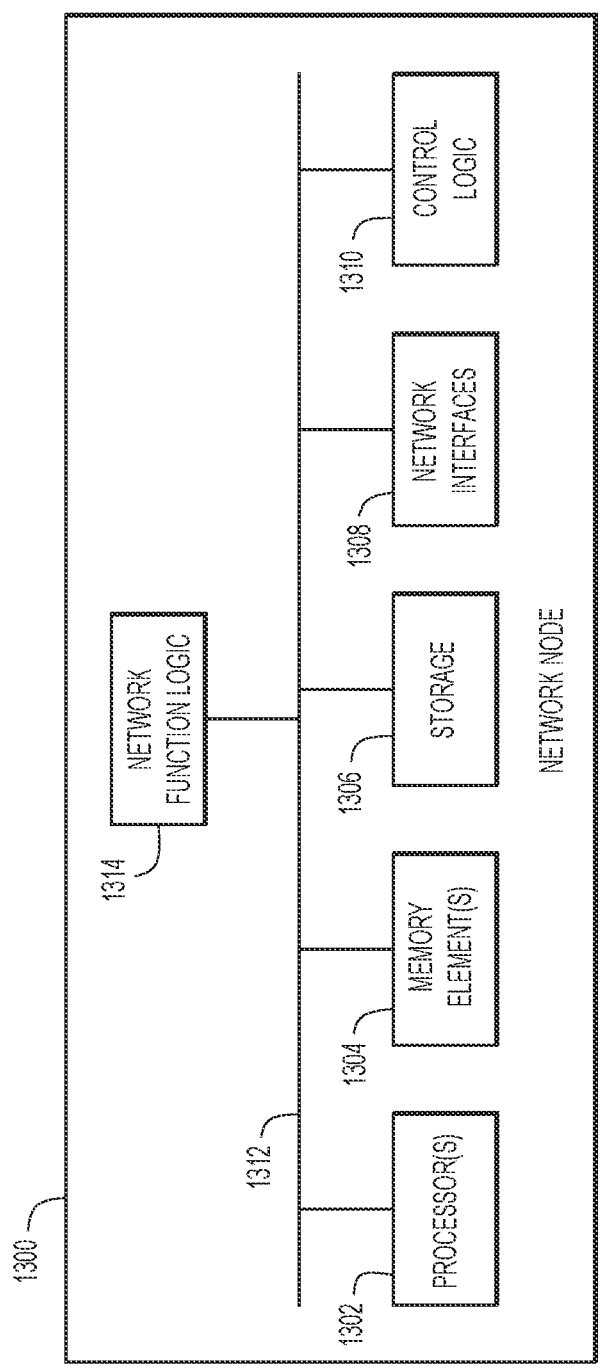
FIG. 13 illustrates a block diagram of a network node for a network function (NF), such as an SMF, configured to perform operations according to some implementations.

FIG. 13 is a simplified block diagram illustrating example details that can be associated with a network node 1300 (network equipment, a compute or computing node) for an NF, such as an SMF or even a UPF, in accordance with some implementations described herein. In various embodiments, network element functionality may be performed using any combination of network nodes. In various embodiments, network node 1300 can be implemented as, for example, a data center network node such as a server, rack of servers, multiple racks of servers, etc., for a data center; or a cloud network node, which may be distributed across one or more data centers.

In some implementations, network node 1300 can include can include one or more processors 1302, one or more memory elements 1304, storage 1306, network interfaces 1308, control logic 1310 and network function logic 1314. In some implementations, the processors 1302 are at least one hardware processor configured to execute various tasks, operations and/or functions for network node 1300 as described herein according to software and/or instructions configured for the network node 1300. In some implementations, memory elements 1304 and/or storage 1306 are configured to store data, information, software, instructions, logic (e.g. any logic 1310 and/or 1314), data structures, combinations thereof, or the like for various embodiments described herein. Note that in some implementations, storage can be consolidated with memory elements (or vice versa), or can overlap/exist in any other suitable manner.

In some implementations, network interfaces 1308 enable communication between for network node 1300 and other network elements, systems, slices, etc. that may be present in the system to facilitate operations as discussed for various embodiments described herein. In some implementations, network interfaces 1308 can include one or more Ethernet drivers and/or controllers, Fiber Channel drivers, and/or controllers, or other similar network interface drivers and/or controllers to enable communications for network node 1300 within the system.

In some implementations, control logic 1310 can include instructions that, when executed (e.g. via processors 1302), cause for network node 1300 to perform operations, which can include, but not be limited to, providing overall control operations of network node 1300; cooperating with other logic, data structures, etc. provisioned for and/or maintained by network node 1300; combinations thereof; or the like to facilitate various operations as discussed for various embodiments described herein.

In some implementations, bus 1312 can be configured as an interface that enables one or more elements of network node 1300 (e.g. processors 1302, memory elements 1304, logic, etc.) to communicate in order to exchange information and/or data. In at least one embodiment, bus 1312 may be implemented as a fast kernel-hosted interconnect, potentially using shared memory between processes (e.g. logic, etc.), which can enable efficient communication paths between the processes. In some implementations, network function logic 1314 can include instructions that, when executed (e.g. via one or more processors 1302) cause network node 1300 to perform one or more operations for one or more network elements as discussed for various implementations described herein.

In some implementations, each of the elements of the system may couple to one another through simple interfaces or through any other suitable connection (wired or wireless), which provides a viable pathway for network communications. As referred to herein, a physical (wired or wireless) interconnection or interface may refer to an interconnection of one element or node with one or more other element(s), while a logical interconnection or interface may refer to communications, interactions and/or operations of elements with each other, which may be directly or indirectly interconnected, in a network environment.

Thus, according to some implementations of the present disclosure, a technique may involve at a UPF for use in a mobile network which may receive an IPv6 data packet which includes a segment routing header and a payload containing UP traffic data associated with a UE. The segment routing header may indicate a list of segment identifiers comprising IPv6 addresses, where each IPv6 address has at least a first address portion and a second address portion. Each one (of at least some) of the first address portions of the IPv6 addresses may indicate a location of a corresponding UPF in a set of UPFs which define a forwarding path of the IPv6 data packet in the mobile network. Each one (of at least some) of the second address portions of the IPv6 addresses may indicate one or more rules, actions, or parameters to be applied to the IPv6 data packet at the corresponding UPF in the set of UPFs indicated by the first address portion that is associated with the second address portion. The UPF may process the IPv6 data packet by applying the one or more rules, actions, or parameters, indicated in the second address portion that is associated with the first address portion indicating the location of the UPF.

Also, according to other implementations, a technique of the present disclosure may involve a UPF (e.g. a head-end UPF) for use in a mobile network which may receive an IPv6 data packet which includes a payload containing UP data associated with a UE and insert header information in a segment routing header of the IPv6 data packet. The header information may indicate a list of segment identifiers comprising IPv6 addresses, where each IPv6 address has at least a first address portion and a second address portion. Each one (of at least some) of the first address portions of the IPv6 addresses may indicate a location of a corresponding UPF in a set of UPFs which define a forwarding path of the IPv6 data packet in the mobile network. Each one (of at least some) of the second address portions of the IPv6 addresses may indicate one or more rules, actions, or parameters to be applied to the IPv6 data packet at the corresponding UPF in the set of UPFs indicated by the first address portion that is associated with the second address portion. The UPF may forward the IPv6 data packet toward a next one in the set of UPFs.

According to even other implementations, a technique of the present disclosure may involve an SMF for use in a mobile network which may select or identify a selection of a set of UPFs which define a forwarding path; establish a session with a UPF in the set of UPFs; and send, to the UPF, session management information associated with a session for a UE. The session management information may be sent to a UPF which comprises a head-end UPF which is configured to receive an IPv6 data packet which includes a payload containing UP data associated with the UE; insert, in a segment routing header of the IPv6 data packet, header information corresponding to the session management information; and forward the IPv6 data packet toward a next UPF in the set of UPFs along the forwarding path. The header information may indicate a list of segment identifiers comprising IPv6 addresses, where each IPv6 address having at least a first address portion and a second address portion. Each one (of at least some) of the first address portions of the IPv6 addresses may indicate a location of a corresponding UPF in the first set of UPFs which define the first forwarding path of the IPv6 data packet in the mobile network. Each one (of at least some) of the second address portions of the IPv6 addresses may indicate one or more rules, actions, or parameters to be applied to the IPv6 data packet at the corresponding UPF in the first set of UPFs indicated by the first address portion that is associated with the second address portion.

Here, the session management information may comprise first session management information, the header information may comprise first header information, the IPv6 data packet may comprise a first IPv6 data packet, the list of segment identifiers may comprise a first list of segment identifiers, the set of UPFs which define the forwarding path may comprise a first set of UPFs which define a first forwarding path. The SMF may subsequently select or identify a selection of a second set of UPFs which define a second forwarding path, where the second set of UPFs includes at least one new UPF to replace at least one existing UPF in the first set of UPFs, and send to the UPF second session management information associated with the session for the UE, where the second session management information indicates at least the second set of UPFs or the at least one new UPF. The second session management information may be sent to the UPF which comprises the head-end UPF which is further configured to receive a second IPv6 data packet which includes a payload containing UP traffic data associated with the UE; insert, in a segment routing header of the second IPv6 data packet, second header information corresponding to the second session management information; and forward the second IPv6 data packet toward a next UPF in the second set of UPFs along the second forwarding path. The second header information may indicate a second list of segment identifiers comprising IPv6 addresses, where each IPv6 address of the second list has at least a first address portion and a second address portion. Each one (of at least some of) the first address portions of the second IPv6 addresses of the second list indicates a location of a corresponding UPF in the second set of UPFs which define the second forwarding path of the second IPv6 data packet in the mobile network. Each one (of at least some) of the second address portions of the IPv6 addresses of the second list indicates one or more rules, actions, or parameters to be applied to the second IPv6 data packet at the corresponding UPF in the second set of UPFs indicated by the first address portion that is associated with the second address portion.

Notably, in some implementations associated with the SMF, the at least one new UPF in the second set of UPFs may be determined to replace the at least one existing UPF in the first set of UPFs based on a metric indicating one of link quality, congestion, or loading associated with the at least one existing UPF.

Note that the terms 'data', 'information', 'parameters' and variations thereof as used herein may refer to any type of binary, numeric, voice, video, textual or script data or information or any type of source or object code, or any other suitable data or information in any appropriate format that may be communicated from one point to another in electronic devices and/or networks. Additionally, messages, requests, responses, replies, queries, etc. are forms of network traffic and, therefore, may comprise one or more packets.

Also note that a system or network may represent a series of points or nodes of interconnected communication paths (wired or wireless) for receiving and transmitting packets of information that propagate through the network. In some implementations, a network may be associated with and/or provided by a single network operator or service provider and/or multiple network operators or service providers. In various embodiments, the network may include and/or overlap with, in whole or in part, one or more packet data network(s) (e.g. one or more packet data networks). A network may offer communicative interfaces between various elements and may be further associated with any local area network (LAN), wireless local area network (WLAN), metropolitan area network (MAN), wide area network (WAN), virtual private network (VPN), Radio Access Network (RAN), virtual local area network (VLAN), enterprise network, Intranet, extranet, Low Power Wide Area Network (LPWA N), Low Power Network (LPN), Machine to Machine (M2M) network, IoT Network, or any other appropriate architecture or system that facilitates communications in a network environment.

Note that the terms 'UE', 'mobile device,' 'mobile radio device,' 'end device', 'user', 'subscriber' or variations thereof may be used interchangeably and are inclusive of devices used to communicate, such as a computer, an electronic device such as an IoT device (e.g. an appliance, a thermostat, a sensor, a parking meter, etc.), a personal digital assistant (PDA), a laptop or electronic notebook, a cellular telephone, an IP phone, an electronic device having cellular and/or Wi-Fi connection capabilities, a wearable electronic device, or any other device, component, element, or object capable of initiating voice, audio, video, media, or data exchanges within the system. A UE may also be inclusive of a suitable interface to a human user such as a microphone, a display, a keyboard, or other terminal equipment.

Note that in some implementations, operations as outlined herein to facilitate techniques of the present disclosure may be implemented by logic encoded in one or more tangible media, which may be inclusive of non-transitory tangible media and/or non-transitory computer readable storage media (e.g. embedded logic provided in an ASIC, in digital signal processing (DSP) instructions, software—potentially inclusive of object code and source code—to be executed by a processor, or other similar machine, etc.). In some of these instances, a memory element and/or storage may store data, software, code, instructions (e.g. processor instructions), logic, parameters, combinations thereof or the like used for operations described herein. This includes memory elements and/or storage being able to store data, software, code, instructions (e.g. processor instructions), logic, parameters, combinations thereof, or the like that are executed to carry out operations described herein.

A processor (e.g. a hardware processor) may execute any type of instructions associated with data to achieve the operations detailed herein. In one example, a processor may transform an element or an article (e.g. data, information) from one state or thing to another state or thing. In another example, operations outlined herein may be implemented with logic, which may include fixed logic, hardware logic, programmable logic, digital logic, etc. (e.g. software/computer instructions executed by a processor), and/or one or more the elements identified herein could be some type of a programmable processor, programmable digital logic (e.g. a field programmable gate array (FPGA), a DSP processor, an EPROM, a controller, an electrically erasable PROM (EEPROM), or an ASIC) that includes digital logic, software, code, electronic instructions, or any suitable combination thereof.

It is also noted that the operations and steps described with reference to the preceding figures illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Note that with the examples provided above, as well as numerous other examples provided herein, interaction may be described in terms of one, two, three, or four network elements. However, this has been done for purposes of clarity and example only. In certain cases, it may be easier to describe one or more of the functionalities by only referencing a limited number of network elements. It should be appreciated that the system (and its teachings) are readily scalable and may accommodate a large number of components, as well as more complicated/sophisticated arrangements and configurations. Accordingly, the examples provided should not limit the scope or inhibit the broad teachings of the system as potentially applied to a myriad of other architectures.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access, interfaces and protocols, the system may be applicable to other exchanges or routing protocols, interfaces, and/or communications standards, proprietary, and/or non-proprietary. Moreover, although the system has been illustrated with reference to particular elements and operations that facilitate the communication process, these elements, and operations may be replaced by any suitable architecture or process that achieves the intended functionality of the system.

Although in some implementations of the present disclosure, one or more (or all) of the components, functions, and/or techniques described in relation to the figures may be employed together for operation in a cooperative manner, each one of the components, functions, and/or techniques may indeed be employed separately and individually, to facilitate or provide one or more advantages of the present disclosure.

It will also be understood that, although the terms "first," "second," etc. may be used herein to describe various elements, these elements should not be limited by these terms. These terms are used to distinguish one element from another. For example, a first segment identifier could be termed a second segment identifier, and similarly, a second segment identifier could be termed a first segment identifier, without changing the meaning of the description, so long as all occurrences of the "first segment identifier" are renamed consistently and all occurrences of the "second segment identifier" are renamed consistently. The first segment identifier and the second segment identifier are both segment identifiers, but they are not the same segment identifier.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The invention claimed is:

1. A method comprising:
   at a user plane function (UPF) for use in a mobile network,
      receiving an Internet Protocol version 6 (IPv6) data packet which includes a segment routing header and a payload containing user plane (UP) traffic data associated with a user equipment (UE), the segment routing header indicating a list of segment identifiers comprising IPv6 addresses, each IPv6 address having at least a first address portion and a second address portion;
      wherein each one of at least some of the first address portions of the IPv6 addresses indicates a location of a corresponding UPF in a set of UPFs having a plurality of locations respectively indicated by the first address portions for defining a forwarding path of the IPv6 data packet in the mobile network;
      wherein each one of at least some of the second address portions of the IPv6 addresses indicates one or more rules, actions, or parameters to be applied to the IPv6 data packet at the corresponding UPF located at the first address portion that is associated with the second address portion;
      wherein the one or more rules, actions, or parameters comprise one or more of a Forwarding Action Rule (FAR), a Buffering Action Rule (BAR), a Quality of Service (QoS) Enforcement Rule (QER), a Usage Reporting Rule (URR), associated with a set of policy rules for handling the UP traffic data associated with the UE; and
      performing UPF packet processing on the IPv6 data packet by applying, to the IPv6 data packet, the one or more rules, actions, or parameters, indicated in the second address portion that is associated with the first address portion indicating the location of the UPF.

2. The method of claim 1, wherein the IPv6 data packet comprises a Segment Routing (SR) for IPv6 (SRv6) data packet and the segment identifiers comprise segment IDs (SIDs).

3. The method of claim 1, wherein the segment routing header includes one or more Type-Length-Values (TLVs) indicating the one or more rules, actions, or parameters.

4. The method of claim 1, wherein at least one of the IPv6 addresses comprises an anycast address for dynamic routing in the forwarding path.

5. The method of claim 1, wherein the one or more rules, actions, or parameters further comprise a Quality of Service (QoS) Flow Index (QFI), a Radio/Link Quality Index (RQI), or both.

6. The method of claim 1, further comprising:
   at the UPF,
      forwarding the IPv6 data packet toward a next UPF in the set of UPFs in the forwarding path.

7. The method of claim 1, further comprising:
   at the UPF,
      inserting, in the segment routing header or a Type-Length-Value (TLV) list thereof, a metric indicating one of link quality, congestion, or loading at the UPF, the metric being part of a list of metrics in the segment routing header or the TLV list for use in optimizing the forwarding path in the mobile network.

8. The method of claim 1, wherein the UPF serves as an intermediate UPF which operates as stateless for communications of the UE.

9. The method of claim 8, further comprising:
   at the UPF,
      refraining from maintaining Packet Forwarding Control Protocol (PFCP) session information in memory for the communications of the UE.

10. A user plane function (UPF) node having a UPF, the UPF node comprising:
   a plurality of interfaces;
   one or more processors;
   memory coupled to the one or more processors;
   the one or more processors configured to operate the UPF node to:
      receive, via one of the interfaces, an Internet Protocol version 6 (IPv6) data packet which includes a segment routing header and a payload containing user plane (UP) traffic data associated with a user equipment (UE) operative in a mobile network, the segment routing header indicating a list of segment identifiers comprising IPv6 addresses, each IPv6 address having at least a first address portion and a second address portion;
      wherein each one of at least some of the first address portions of the IPv6 addresses indicates a location of a corresponding UPF in a set of UPFs having a plurality of locations respectively indicated by the first address portions for defining a forwarding path of the IPv6 data packet in the mobile network;

wherein each one of at least some of the second address portions of the IPv6 addresses indicates a set of policy rules for handling the UP traffic data associated with the UE, to be applied to the IPv6 data packet at the corresponding UPF located at the first address portion that is associated with the second address portion;

wherein the set of policy rules comprises one or more of a Forwarding Action Rule (FAR), a Buffering Action Rule (BAR), a Quality of Service (QoS) Enforcement Rule (QER), or a Usage Reporting Rule (URR); and perform UPF packet processing on the IPv6 data packet by applying, to the IPv6 data packet, the set of policy rules indicated in the second address portion that is associated with the first address portion indicating the location of the UPF.

11. The UPF node of claim 10, wherein the IPv6 data packet comprises a Segment Routing (SR) for IPv6 (SRv6) data packet and the segment identifiers comprise segment IDs (SIDs).

12. The UPF node of claim 10, wherein each one of the second address portions further indicates one or more parameters to be applied in performing the UPF packet processing on the IPv6 data packet.

13. The UPF node of claim 10, wherein the one or more processors are further configured to operate the UPF node to:

insert, in the segment routing header or a Type-Length-Value (TLV) list thereof, a metric indicating one of link quality, congestion, or loading at the UPF node, the metric being part of a list of metrics in the segment routing header or the TLV list, for use in optimizing the forwarding path in the mobile network.

14. A method comprising:

at a user plane function (UPF) operative to serve as a head-end UPF in a set of UPFs in a mobile network, and to receive session management information from a control plane (CP) for session management, receiving an Internet Protocol version 6 (IPv6) data packet which includes a payload containing user plane (UP) traffic data associated with a user equipment (UE);

inserting, in a segment routing header of the IPv6 data packet, header information which corresponds to the session management information, the header information indicating a list of segment identifiers comprising IPv6 addresses, each IPv6 address having at least a first address portion and a second address portion;

wherein each one of at least some of the first address portions of the IPv6 addresses indicates a location of a corresponding UPF in the set of UPFs having a plurality of locations respectively indicated by the first address portions for defining a forwarding path of the IPv6 data packet in the mobile network;

wherein each one of at least some of the second address portions of the IPv6 addresses indicates one or more rules, actions, or parameters to be applied to the IPv6 data packet at the corresponding UPF located at the first address portion that is associated with the second address portion;

wherein the one or more rules, actions, or parameters comprise one or more of a Forwarding Action Rule (FAR), a Buffering Action Rule (BAR), a Quality of Service (QoS) Enforcement Rule (QER), or a Usage Reporting Rule (URR), associated with a set of policy rules for handling the UP traffic data associated with the UE; and forwarding the IPv6 data packet toward a next one in the set of UPFs.

15. The method of claim 14, wherein the IPv6 data packet comprises a Segment Routing (SR) for IPv6 (SRv6) data packet and the segment identifiers comprise segment IDs (SIDs).

16. The method of claim 14, further comprising:
at the UPF,
inserting, in one or more Type-Length-Values (TLVs) of the segment routing header, the one or more rules, actions, or parameters.

17. The method of claim 14, further comprising:
at the UPF,
inserting, in the segment routing header or a Type-Length-Value (TLV) list thereof, a metric indicating one of link quality, congestion, or loading at the UPF, the metric being part of a list of metrics in the segment routing header or the TLV list, for use in optimizing the forwarding path in the mobile network.

18. The method of claim 14, wherein the one or more rules, actions, or parameters further comprise a Quality of Service (QoS) Flow Index (QFI), a Radio/Link Quality Index (RQI), or both.

19. The method of claim 14,
wherein at least one of the IPv6 addresses comprises an anycast address for dynamic routing in the forwarding path.

20. The method of claim 14, wherein the CP for session management comprises a session management function (SMF).

* * * * *

UNITED STATES PATENT AND TRADEMARK OFFICE
CERTIFICATE OF CORRECTION

| | | |
|---|---|---|
| PATENT NO. | : 11,095,559 B1 | Page 1 of 1 |
| APPLICATION NO. | : 16/574501 | |
| DATED | : August 17, 2021 | |
| INVENTOR(S) | : Pablo Camarillo Garvia et al. | |

It is certified that error appears in the above-identified patent and that said Letters Patent is hereby corrected as shown below:

In the Claims

Claim 7, Column 24, Line 38, please replace "TLV list for use" with --TLV list, for use--

Signed and Sealed this
Fourth Day of January, 2022

Drew Hirshfeld
*Performing the Functions and Duties of the
Under Secretary of Commerce for Intellectual Property and
Director of the United States Patent and Trademark Office*